(12) United States Patent
Ebihara

(10) Patent No.: US 7,588,112 B2
(45) Date of Patent: Sep. 15, 2009

(54) BI-DIRECTIONAL CLUTCH AND VEHICLE WITH IT

(75) Inventor: Tomoyuki Ebihara, Amagasaki (JP)

(73) Assignee: Kanzaki Kokyukoki Mfg. Co., Ltd. (JP)

(*) Notice: Subject to any disclaimer, the term of this patent is extended or adjusted under 35 U.S.C. 154(b) by 572 days.

(21) Appl. No.: 11/399,362

(22) Filed: Apr. 7, 2006

(65) Prior Publication Data
US 2006/0254382 A1    Nov. 16, 2006

(30) Foreign Application Priority Data
Apr. 12, 2005  (JP) ............................. 2005-114381
Jun. 1, 2005   (JP) ............................. 2005-161675

(51) Int. Cl.
*B60K 17/35*   (2006.01)
*F16D 27/12*   (2006.01)

(52) U.S. Cl. ...................... 180/248; 180/249; 192/48.2; 74/650

(58) Field of Classification Search .................. 180/248, 180/249; 192/38, 40, 43, 45, 48.2; 74/650
See application file for complete search history.

(56) References Cited

U.S. PATENT DOCUMENTS 3,700,082 A * 10/1972 Schwab ..................... 192/50
4,787,491 A * 11/1988 Kato ......................... 192/48.6
5,025,902 A *  6/1991 Imai et al. ................... 192/43
5,036,939 A    8/1991 Johnson et al.
5,845,546 A * 12/1998 Knowles et al. ............. 74/650
RE38,012 E     3/2003 Ochab et al.

FOREIGN PATENT DOCUMENTS

JP      2003-278804      10/2003

OTHER PUBLICATIONS

European Search Report in corresponding European Appln. No. EP 06 00 7577.

* cited by examiner

*Primary Examiner*—Lesley D Morris
*Assistant Examiner*—Marc A Scharich
(74) *Attorney, Agent, or Firm*—Sterne, Kessler, Goldstein & Fox P.L.L.C.

(57) ABSTRACT

A bi-directional clutch to be equipped on a vehicle, which is selectively automatically clutched off for putting the vehicle into a two-wheel drive mode or clutched on for putting the vehicle into a four-wheel drive mode, in correspondence to a condition of the vehicle during either forward traveling or backward traveling. The invention also relates to a vehicle equipped with the bi-directional clutch.

28 Claims, 23 Drawing Sheets

(a)

(b)

(c)

BI-DIRECTIONAL CLUTCH AND VEHICLE WITH IT

BACKGROUND OF THE INVENTION

1. Field of the Invention

The invention relates to a bi-directional clutch to be equipped on a vehicle, which is selectively automatically clutched off for putting the vehicle into a two-wheel drive mode or clutched on for putting the vehicle into a four-wheel drive mode, in correspondence to a condition of the vehicle during either forward traveling or backward traveling. The invention also relates to a vehicle equipped with the bi-directional clutch.

2. Related Art

Conventionally, there is a well-known bi-directional clutch to be equipped on a vehicle, which is selectively automatically clutched off for putting the vehicle into a two-wheel drive mode or clutched on for putting the vehicle into a four-wheel drive mode, in correspondence to a condition of the vehicle during either forward traveling or backward traveling, as disclosed in JP2003-278804A1. The disclosed bi-directional clutch comprises an input side rotor and a pair of left and right output side rotors. The input side rotor is concentrically fitted around the output side rotors through a cage holding rollers. In the normal traveling condition of the vehicle, the clutch is clutched off in such a way that the rollers are held to be separated from the inner peripheral surface of the input side rotor and the outer peripheral surfaces of the output side rotors, thereby preventing the rotary force of the input side rotor from being transmitted to the output side rotors, and thereby keeping the vehicle in the two-wheel drive mode. When the rotary speed of the output side rotors becomes smaller than that of the input side rotor during travel of the vehicle, the clutch is clutched on in such a way that the rollers are wedged up between the inner peripheral surface of the input side rotor and the outer peripheral surface of each of the output side rotors, so as to transmit the rotary force of the input side rotor to the output side rotors. Consequently, the vehicle can be automatically put into the four-wheel drive mode only when the vehicle requires an especially large traction force.

If the bi-directional clutch is used for a transaxle of an off-road type four-wheel drive vehicle, the torque is readily confined in the clutch when the input side rotor and the output side rotors are wedged with each other in a high ground-load condition. Consequently, when the forward/backward traveling direction of the vehicle in the four-wheel drive mode is changed, the rollers wedged between the inner peripheral surface of the input side rotor and the outer peripheral surface of each of the output side rotors cannot release from the input side rotor or the output side rotor. Once the problem occurs, the unexpected four-wheel drive mode is subsequently maintained, so as to reduce the fuel efficiency, and to hinder the differential rotation of the left and right output side rotors for steering the vehicle.

SUMMARY OF THE INVENTION

An object of the invention is to provide a bi-directional clutch which can be smoothly and surely clutched off when either a forward or backward traveling direction of a vehicle with the bi-directional clutch having been clutched on is reversed into the other direction, thereby preventing the above problem.

To achieve the object, a bi-directional clutch according to the present invention comprises: an input portion; an input side rotor drivingly connected to the input portion; an output side rotor coaxially disposed inside the input side rotor, so as to make a annular space between an inner peripheral surface of the input side rotor and an outer peripheral surface of the output side rotor; a cage disposed in the annular space; a plurality of rollers held by the cage so as to be able to engage with both the inner peripheral surface of the input side rotor and the outer peripheral surface of the output side rotor, and to disengage from at least either the inner peripheral surface of the input side rotor or the outer peripheral surface of the output side rotor; an unrotatable portion; frictional engaging means for frictionally and relatively rotatably engaging the cage with the unrotatable portion; a casing incorporating the input side rotor, the output side rotor, the cage, the rollers and the frictional engaging means; and rotation restricting means for restricting rotation of the cage holding the rollers. When a rotary speed of the output side rotor is larger than a rotary speed of the input side rotor, the rollers disengage from either the inner peripheral surface of the input side rotor or the outer peripheral surface of the output side rotor so as to isolate the output side rotor from the rotary force of the input side rotor. When a rotary speed of the output side rotor is smaller than a rotary speed of the input side rotor, the rollers engage with the inner peripheral surface of the input side rotor and the outer peripheral surface of the output side rotor so as to wedge the input side rotor with the output side rotor, thereby allowing the rotary force of the input side rotor to be transmitted to the output side rotor. The rotation restricting means temporarily restricts the rotation of the cage when a rotary direction of the input side rotor wedged with the output side rotor through the rollers is reversed.

Due to the temporal rotational restriction of the cage by the rotation restricting means, the rotation of the cage is forcibly delayed relative to the rotation of the input side rotor, so that the rollers, which have engaged with the inner peripheral surface of the input side rotor and the outer peripheral surface of the output side rotor, are surely separated from the inner peripheral surface of the input side rotor and the outer peripheral surface of the output side rotor, thereby clutching off the bi-directional clutch having been clutched on, and thereby putting the vehicle reversed in the travel direction thereof into the two-wheel drive mode for ensuring a sufficient drive and fuel efficiency. Further, when left and right output side rotors are provided for respective left and right axles, the output side rotors released from the input side rotor due to the temporal rotation restriction of the cage can be differentially rotated so as to ensure a proper turn of the vehicle. Consequently, the present bi-directional clutch is well suited for an off-road type four-wheel drive vehicle because of its stable clutching on/off performance under such a ground condition as to severely stress wheels of the vehicle.

In a first aspect of the bi-directional clutch, the rotation restricting means includes: a receiving portion formed on an end surface of the cage; a forcible engaging member held by the casing so as not to be rotatable relatively to the casing; a biasing member biasing the forcible engaging member so as to thrust out the forcible engaging member toward the receiving portion; and a retainer for holding a condition of the forcible engaging member separated from the receiving portion. Only when the rotary direction of the input side rotor is reversed, the retainer allows the forcible engaging member biased by the biasing member to thrust to the receiving portion and to engage with the receiving portion so as to restrict the rotation of the cage.

Due to the construction of the rotation restricting means, the temporal rotational restriction of the cage when the rotational direction of the input side rotor is reversed is ensured so as to cancel the wedging of the input side rotor with the output side rotor, thereby allowing the bi-directional clutch to be clutched off. The bi-directional clutch is well suited for an off-road type four-wheel drive vehicle because of its stable clutching on/off performance under such a ground condition as to severely stress wheels of the vehicle.

Preferably, in the first aspect, the frictional engaging means includes a spring interposed between the cage and the input side rotor so as to frictionally and relatively rotatably press the cage against the retainer.

Due to the spring, the retainer of the rotation restriction means for restricting rotation of the cage also serves as an element of the frictional engaging means for frictionally and relatively rotatably engaging the cage with the unrotatable means, thereby saving the number of parts and miniaturizing the bi-directional clutch.

Further preferably, when the rotary direction of the input side rotor is reversed, the retainer rotates following the rotation of the cage so as to thrust out and engage the forcible engaging member to the receiving portion.

Therefore, the rotation of the retainer following the cage when the rotational direction of the input side rotor is reversed is utilized so as to require no additional component for thrusting the forcible engaging member to engage the forcible engaging member with the cage. Consequently, the bi-directional clutch can be simplified and miniaturized by saving the number of components.

Further preferably, the bi-directional clutch further comprises: second rotation restricting means for restricting the rotation of the retainer following the rotation of the cage; and releasing means for canceling the rotation-restriction of the cage by the second rotation restricting means.

Due to the second rotation restricting means and the releasing means, after the rotation of the cage is restricted for canceling the wedging thereof during the reversing of rotation of the input side rotor, the cage can be recovered to its normal condition where the bi-directional clutch can be normally clutched on-and-off.

Further preferably, the second rotation restriction means includes: a pair of projections disposed at a certain interval therebetween on the retainer; and a retaining portion integrally provided on the casing between the pair of projections. The rotation of the retainer following the cage is restricted by fitting one of the projections onto the retaining portion.

Since the retainer serving as the rotation restricting means and the casing are formed to provide the projections and the retaining portion which are elements of the second rotation restricting means, the bi-directional clutch can be simplified and miniaturized by saving the number of components.

Further preferably, the releasing means includes the receiving portion and the retainer. The receiving portion projects from the end surface of the cage so that, during the rotation of the retainer following the cage, the receiving portion fitting the forcible engaging member pushes the forcible engaging member toward the retainer and finally separates the forcible engaging member therefrom, and then the retainer holds the forcible engaging member separated from the retaining portion.

Since the natural separation of the forcible engaging member from the receiving portion during the rotation of the retainer following the cage depends on the only shaping of the receiving portion of the input side rotor, and requires no additional component, the bi-directional clutch can be simplified and miniaturized by saving the number of components.

Alternatively, in a second aspect of the bi-directional clutch, the rotation restricting means includes: a receiving portion formed on an end surface of the cage; a forcible engaging member held by the casing so as to be prevented from rotating relative to the casing; a biasing member biasing the forcible engaging member opposite to the end surface of the cage; and a cam member frictionally and relatively rotatably pressed against the input side rotor. The cam member includes a cam portion. When the forcible engaging member is held to be separated from the receiving portion by the biasing force of the biasing member, the cam member can rotate following the input side rotor only by reversing rotation of the input side rotor, and due to the rotation of the cam member following the input side rotor, the forcible engaging member rides on the cam portion of the cam member, thrusts toward the receiving portion against the biasing force of the biasing member, and finally engages with the receiving portion.

Due to the construction of the rotation restricting means, the temporal rotational restriction of the cage when the rotational direction of the input side rotor is reversed is ensured so as to cancel the wedging of the input side rotor with the output side rotor, thereby allowing the bi-directional clutch to be clutched off. The bi-directional clutch is well suited for an off-road type four-wheel drive vehicle because of its stable clutching on/off performance under such a ground condition as to severely stress wheels of the vehicle.

Preferably, in the second aspect, the bi-directional clutch further comprises: second rotation restriction means for restricting rotation of the cam member following the input side rotor; and releasing means for canceling restriction of the rotation of the cage after the second rotation restriction means restricts the rotation of the cam member.

Due to the second rotation restricting means and the releasing means, after the rotation of the cage is restricted for canceling the wedging thereof during the reversing of rotation of the input side rotor, the cage can be recovered to its normal condition where the bi-directional clutch can be normally clutched on-and-off.

Further preferably, the second rotation restriction means includes: a retainer disposed between the cam member and the input side rotor with the cage so as to be prevented from rotating relative to the casing; an opening formed through the retainer and extended in the rotational direction of the cam member; and a restriction member projecting from the cam member and passed through the opening so as to be rotatable relative to the retainer. The restriction member is frictionally and relatively rotatably pressed against the input side rotor so as to allow the cam member to rotate relative to the input side rotor. The restriction member can abut against either of opposite ends of the opening in the rotational direction of the cam member so as to restrict the rotation of the cam member following the input side rotor.

Due to the passing of the restriction member through the opening, the retainer is used for guiding the restriction member, and for defining the distance between the cam member and the cage. Therefore, the bi-directional clutch can be simplified and miniaturized by saving the number of components.

Further preferably, the forcible engaging member penetrates the retainer between the receiving portion and the cam member.

Therefore, the retainer and the forcible engaging member are prevented from interfering with each other. Further, the distance between the cam member and the cage defined by the retainer does not have to be increased for arranging the forcible engaging means, thereby miniaturizing and simplifying the bi-directional clutch.

Preferably, the releasing means includes the biasing member which separates the forcible engaging member from the receiving portion when the forcible engaging member is removed from the cam portion of the cam member.

Therefore, the bi-directional clutch requires no additional member serving as the releasing means, so that the bi-directional clutch can be simplified and miniaturized by saving the number of components.

Preferably, the frictional engaging means includes a spring interposed between the cage and the input side rotor so as to frictionally and relatively rotatably press the cage against the retainer.

Due to the spring, the retainer serves as an element of the frictional engaging means for frictionally and relatively rotatably engaging with the cage. Therefore, the bi-directional clutch can be simplified and miniaturized by saving the number of components.

Further preferably, the frictional engaging means further includes a friction plate for frictionally fitting the cage to the retainer.

Therefore, the frictional pressure between the retainer and the cage is ensured with the simple and inexpensive friction plate.

Alternatively, the frictional engaging means further includes an electromagnet for frictionally fitting the cage to the retainer.

Therefore, the frictional pressure between the retainer and the cage is ensured with the durable electromagnet which hardly abrades and requires little maintenance.

Alternatively, in a third aspect of the bi-directional clutch, the rotation restricting means includes: a receiving portion formed on an end surface of the cage; a forcible engaging member held by the casing so as to be prevented from rotating relative to the casing, wherein the forcible engaging member can engage with the receiving portion so as to restrict rotation of the cage; a biasing member biasing the forcible engaging member so as to thrust toward the receiving portion; a retainer for holding the forcible engaging member separated from the receiving portion; and an electromagnet which releases the forcible engaging member from the retainer and allows the forcible engaging member to thrust and engage to the receiving portion the receiving portion only when rotation of the input side rotor is reversed.

Therefore, the bi-directional clutch ensures smooth traveling direction switching of a vehicle. The engagement of the forcible engaging member with the cage depends on not complex mechanical structure but the durable electromagnet which hardly abrades and requires little maintenance.

Alternatively, in a fourth aspect of the bi-directional clutch, the rotation restricting means includes: a first rotor prevented from rotating relative to the cage; a forcible engaging member held by the casing so as to be prevented from rotating relative to the casing; and a biasing member biasing the forcible engaging member so as to thrust the forcible engaging member toward the first rotor. The forcible engaging member is thrust to be inserted into the opening and engages with the first rotor so as to restrict rotation of the cage only when the rotational direction of the input side rotor is reversed.

Due to the construction of the rotation restricting means, the temporal rotational restriction of the cage when the rotational direction of the input side rotor is reversed is ensured so as to cancel the wedging of the input side rotor with the output side rotor, thereby allowing the bi-directional clutch to be clutched off. The bi-directional clutch is well suited for an off-road type four-wheel drive vehicle because of its stable clutching on/off performance under such a ground condition as to severely stress wheels of the vehicle.

Preferably, the frictional engaging means includes a plurality of the forcible engaging members frictionally pressed against the first rotor so as to press an outer peripheral edge of the first rotor against a part of the casing.

Therefore, the forcible engaging members and the first rotor, serving as the rotation restricting means, are also provided as elements of the frictional engaging means frictionally and relatively rotatably engaging with the casing, thereby miniaturizing the bi-directional clutch by saving the number of components.

Further preferably, in the fourth aspect, the bi-directional clutch further comprises: a second rotor disposed opposite to the first rotor with respect to the forcible engaging members so as to be prevented from rotating relative to the input side rotor; a projection projecting from the second rotor into the opening of the first rotor, and being rotatable integrally with the second rotor; a third rotor juxtaposed with the second rotor opposite to the first rotor with respect to the forcible engaging members so as to be prevented from rotating relative to the second rotor and the input side rotor but to be allowed to rotate relative to the second rotor and the input side rotor within an only limited range; and another projection projecting from the third rotor into the opening of the first rotor and being rotatable integrally with the third rotor. At least one of the projections projecting from the respective second and third rotors is disposed so as to prevent the forcible engaging member from entering the opening of the first rotor unless the rotational direction of the input side rotor is reversed.

Therefore, unless the rotational direction of the input side rotor is reversed, the first rotor is prevented from engaging with the forcible engaging member by such a simple structure, thereby simplifying and miniaturizing the bi-directional clutch by saving the number of components.

Further preferably, when the rotational direction of the input side rotor is reversed, the third rotor rotates relative to the second rotor within the limited range so as to move the projection projecting from the third rotor in the opening of the first rotor, thereby ensuring a space in the opening of the first rotor into which the forcible engaging member is inserted and engaged with the first rotor so as to temporarily restrict the rotation of the first rotor and the cage.

Therefore, the insertion of the forcible engaging member into the opening of the first rotor for engaging the forcible engaging member with the first rotor depends on the only rotation of the third rotor relative to the second rotor during the reversing of the rotational direction of the input side rotor and depends on no additional component, thereby simplifying and miniaturizing the bi-directional clutch by saving the number of components.

Further preferably, during rotation of the second and third rotors after the engagement of the forcible engaging member with the first rotor, the forcible engaging member is guided by either of the projections projecting from the second and third rotors so as to be removed from the opening of the first rotor, and pressed against the first rotor outside of the opening while disengaging from the first rotor.

Therefore, after the rotation of the cage is restricted for canceling the wedging thereof during the reversing of rotation of the input side rotor, the cage can be recovered to its normal condition where the bi-directional clutch can be normally clutched on-and-off. Further, since the natural removal of the forcible engaging member from the opening during the rotation of the first and second rotors relative to the first rotor depends on the only shaping of the projections projecting from the second and third rotors, and requires no additional component, the bi-directional clutch can be simplified and miniaturized by saving the number of components.

Preferably, in any of the foregoing bi-directional clutches, the output side rotors are provided in a pair and share the common input side rotor, and wherein the plurality of rollers held by the cage are provided to the pair of output side rotors, respectively.

Due to this structure, the bi-directional clutch can serve as a differential unit with the pair of output side rotors drivingly connected to respective left and right axles.

A second object of the invention is to provide a vehicle equipped with the above advantageous bi-directional clutch for differentially driving a pair of drive wheels.

To achieve the second object, a vehicle according to the present invention, a vehicle comprises: a prime mover; a pair of drive wheels; and a bi-directional clutch interposed between the prime mover and the pair of drive wheels. The bi-directional clutch includes: an input portion drivingly connected to the prime mover; a common input side rotor drivingly connected to the input portion; a pair of differentially rotatable output side rotors coaxially disposed inside the input side rotor, so as to make a annular space between an inner peripheral surface of the input side rotor and an outer peripheral surface of each of the output side rotors; a cage disposed in the annular space; a plurality of rollers held by the cage so as to be able to engage with both the inner peripheral surface of the input side rotor and the outer peripheral surface of each of the output side rotors, and to disengage from at least either the inner peripheral surface of the input side rotor or the outer peripheral surface of each of the output side rotors; an unrotatable portion; frictional engaging means frictionally and relatively rotatably engaging the cage with the unrotatable portion; a casing incorporating the input side rotor, the output side rotor, the cage, the rollers and the frictional engaging means; and rotation restricting means for restricting rotation of the cage holding the rollers. When a rotary speed of the output side rotors is larger than a rotary speed of the input side rotor, the output side rotors are isolated from the rotary force of the input side rotor. When a rotary speed of the output side rotors is smaller than a rotary speed of the input side rotor, the rollers engage with the inner peripheral surface of the input side rotor and the outer peripheral surface of the output side rotor so as to wedge the input side rotor with the output side rotors, thereby allowing the rotary force of the input side rotor to be transmitted to the output side rotors. The rotation restricting means temporarily restricts the rotation of the cage when a rotary direction of the input side rotor wedged with the output side rotors through the rollers is reversed.

Due to the bi-directional clutch having the above effect of canceling wedging of the rollers, the vehicle can smoothly return to the two-wheel drive mode due to when the traveling direction of the vehicle is reversed, and thereby ensuring the differential rotation of the drive wheels for smooth and efficient turning of the vehicle.

These, further and other objects, features and advantages will appear more fully from the following description with reference to accompanying drawings.

BRIEF DESCRIPTION OF THE DRAWINGS

FIGS. 20(a), 20(b) and 20(c) are developed sectional views of a portion of the bi-directional clutch of the sixth embodiment, showing a relation between the forcible engaging member and the first rotor, wherein FIG. 20(a) illustrates a state where the forcible engaging member is disengaged from the first rotor before the rotary direction of the input side rotor is reversed, FIG. 20(b) illustrates a state where the forcible engaging member engages with the first rotor so as to restrict rotation of the cage during the reversing of the rotary direction of the input side rotor, and FIG. 20(c) illustrates a state subsequent to the state of FIG. 20(b), where the forcible engaging member having engaged with the first rotor is being separated from the first rotor so as to cancel the rotation-restriction of the cage.

DETAILED DESCRIPTION OF THE INVENTION

Figure 22:
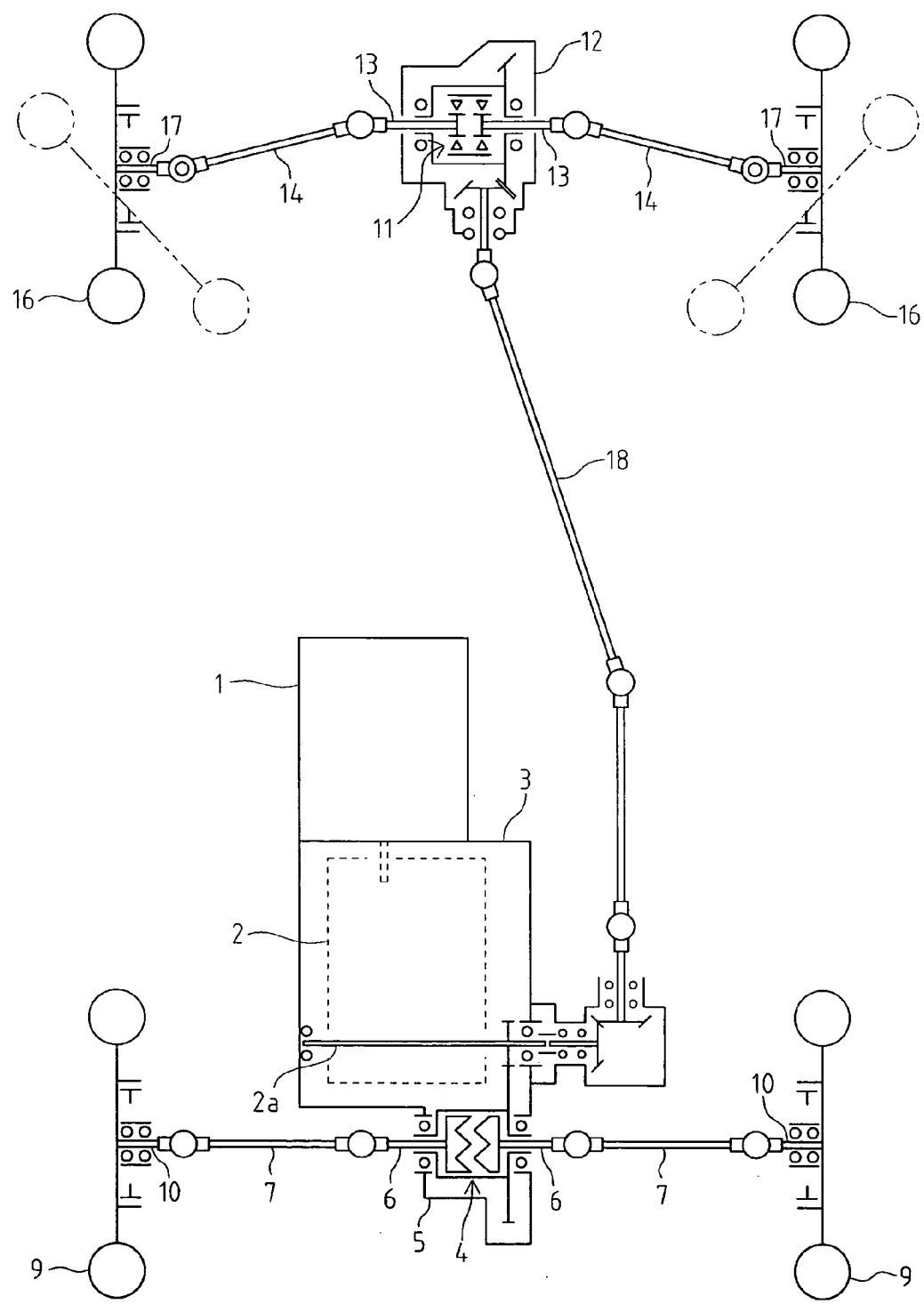
FIG. 22 is a diagram of a traveling power transmission system of a vehicle, wherein the bi-directional clutch of the invention (the representative bi-directional clutch of the first embodiment) is installed in a front-wheel differential gear unit.

Referring to FIG. 22, a vehicle is equipped with a front-wheel differential gear unit including a bi-directional clutch of the invention. At a rear portion of the vehicle are disposed an engine 1 and a transmission casing 3. Transmission casing 3 incorporating a transmission 2 for receiving output power of engine is extended rearward from engine 1. A rear-wheel differential gear casing 5 incorporating a rear-wheel differential gear unit 4 is connected to transmission casing 3. Left and right differential output shafts 6 are extended outward from left and right outsides of rear-wheel differential gear casing 5 and differentially connected to each other through rear-wheel differential gear unit 4 in rear-wheel differential gear casing 5. Left and right rear wheels 9 include respective rear wheel axles 10, which are drivingly connected to respective left and right differential output shafts 6 through respective propeller shafts 7 and universal joints.

At a front end portion of the vehicle is disposed front-wheel differential gear casing 12 incorporating a bi-directional clutch 11 serving as a front-wheel differential gear unit. Left and right differential output shafts 13 are extended outward from left and right outsides of front-wheel differential gear casing 12 and differentially connected to each other through bi-directional clutch 11 in front-wheel differential gear casing 12. Left and right front wheels 16 include respective front wheel axles 17, which are drivingly connected to respective left and right differential output shafts 13 through respective propeller shafts 14 and universal joints. While left and right rear wheels 9 are unsteerable, left and right front wheels 16 are steerably suspended from a vehicle frame.

Transmission 2 includes an output shaft 2a drivingly connected to left and right differential output shafts 6 through rear-wheel differential gear unit 4, so as to output power to rear wheels 9. Output shaft 2a is also drivingly connected to left and right differential output shafts 13 for driving front wheels 16 through a propeller shaft 18 with universal joints extended forward from transmission casing 3 and through bi-directional clutch 11. Bi-directional clutch 11 is selectively clutched on for transmitting power of output shaft 2a to differential output shafts 13, or clutched off for isolating power of output shaft 2a from differential output shafts 13. Therefore, the vehicle can be set in either a two-wheel drive mode or a four-wheel drive mode during either forward or backward travel of the vehicle.

Figure 1:
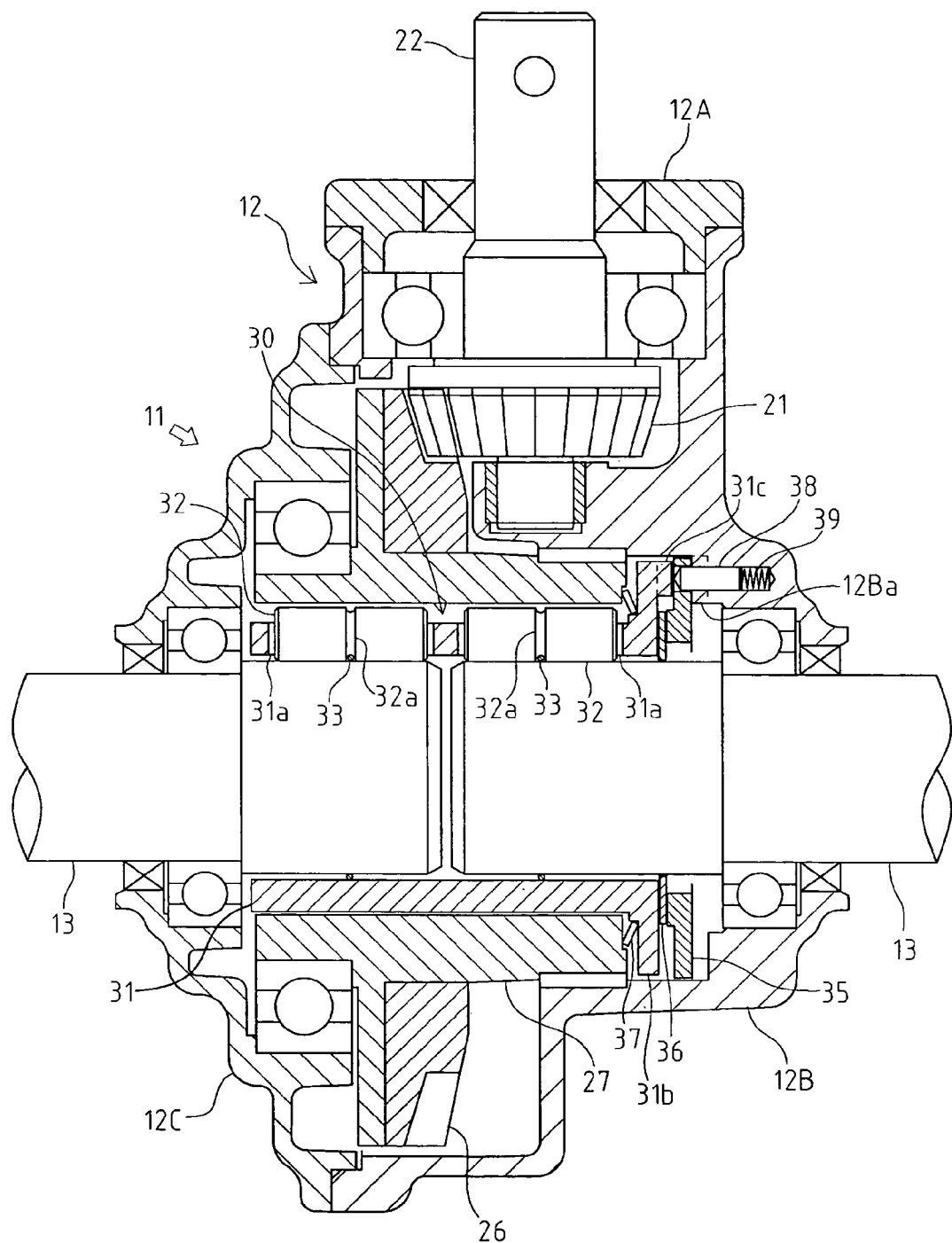
FIG. 1 is a sectional plan view of a differential gear unit with a bi-directional clutch according to a first embodiment of the invention.

Referring to FIGS. 1 to 6, a differential gear unit including a bi-directional clutch 11 according to a first embodiment of the invention will be described. The differential gear unit serves as the front-wheel differential gear unit for driving front wheels 16 when the differential gear unit is used for the vehicle of FIG. 22. As shown in FIG. 1, a first casing part 12A, a second casing part 12B and a third casing part 12C are joined together so as to constitute front-wheel differential gear casing 12 incorporates bi-directional clutch 11. A pinion shaft 22 with a pinion 21 thereon is journalled by first and second casing parts 12A and 12B through bearings. Pinion shaft 22 is drivingly connected to propeller shaft 18 through a universal joint. Left and right differential output shafts 13 are journalled by respective second and third casing parts 12B and 12C through respective bearings, and extended outward from respective second and third casing parts 12B and 12C.

A ring gear shaft 27 is journalled by second and third casing parts 12B and 12C through bearings. Ring gear shaft 27 and a ring gear 26 fixed on ring gear shaft 27 serve as an input side rotor of bi-directional clutch 11. Ring gear 26 meshes with pinion 21, so that ring gear shaft 27 is rotated by receiving output shaft 2a of transmission 2 through propeller shaft 18, pinion shaft 22, pinion 21 and ring gear 26.

Figure 3:
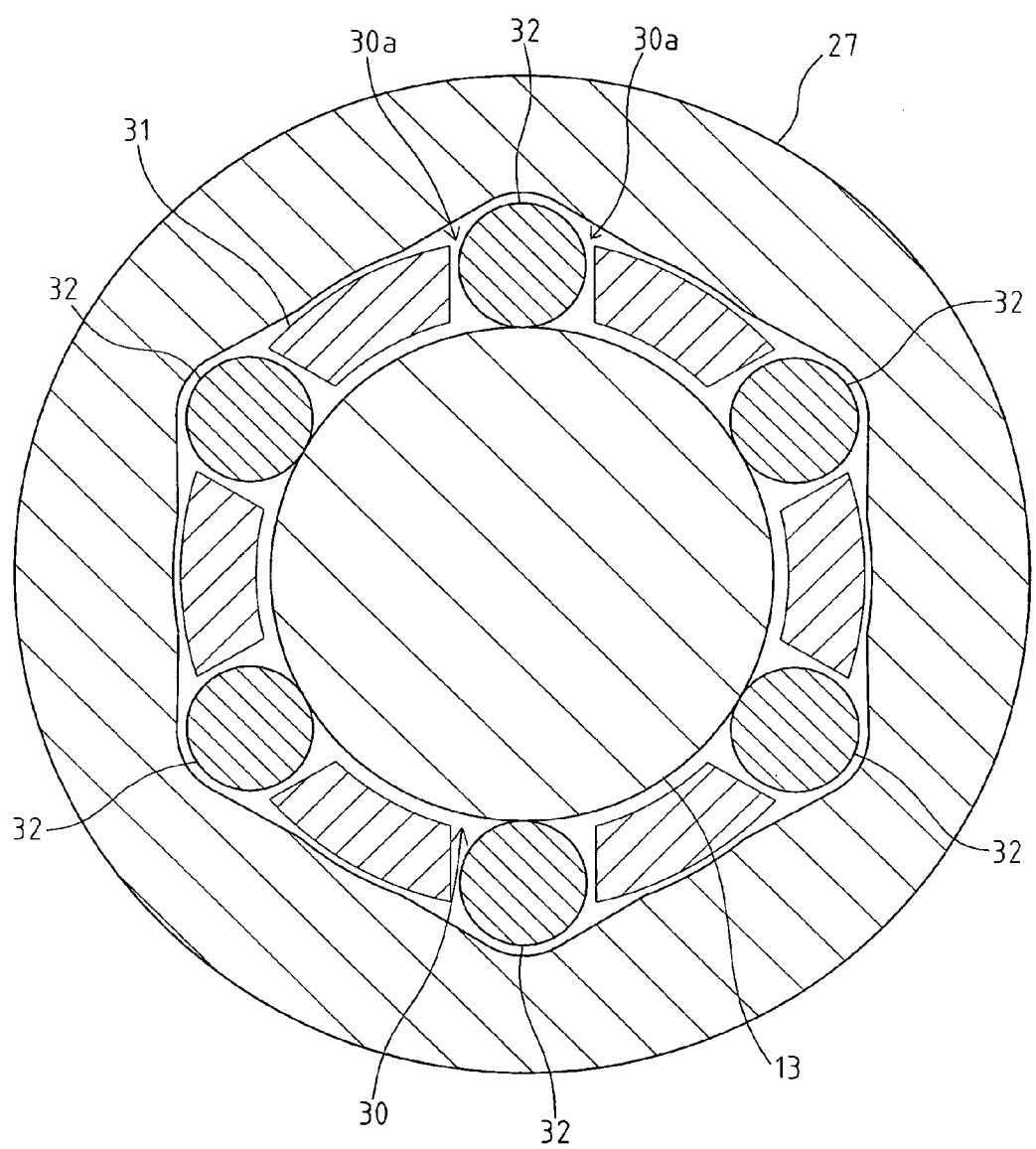
FIG. 3 is a sectional side view of the bi-directional clutch.
Figure 4:
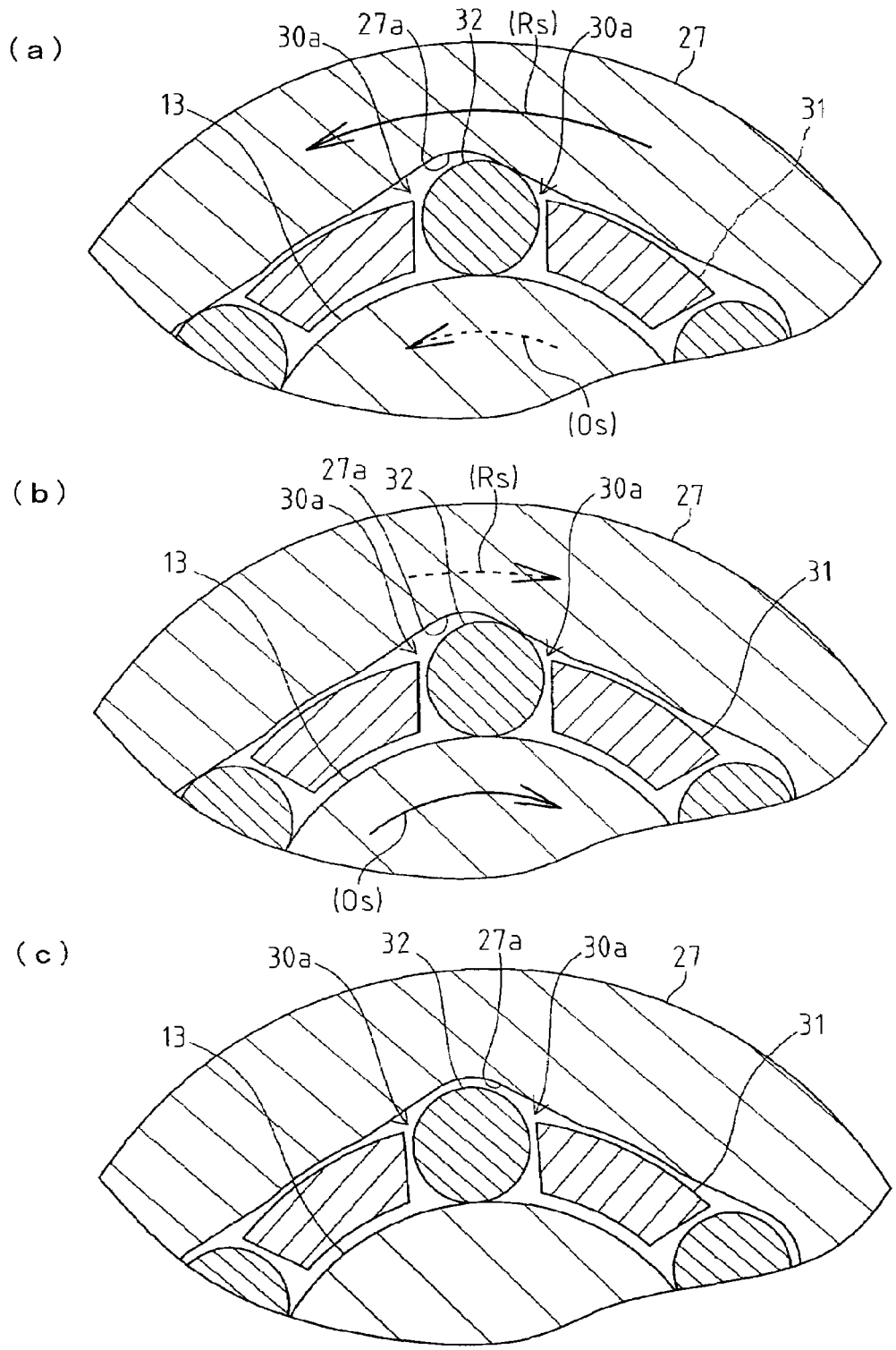
FIGS. 4(a), 4(b) and 4(c) are fragmentary enlarged views of the bi-directional clutch of FIG. 3, showing movement of a cage, rollers and output side rotors in the bi-directional clutch during the reversing of the rotary direction of the input side rotor.
Figure 5:
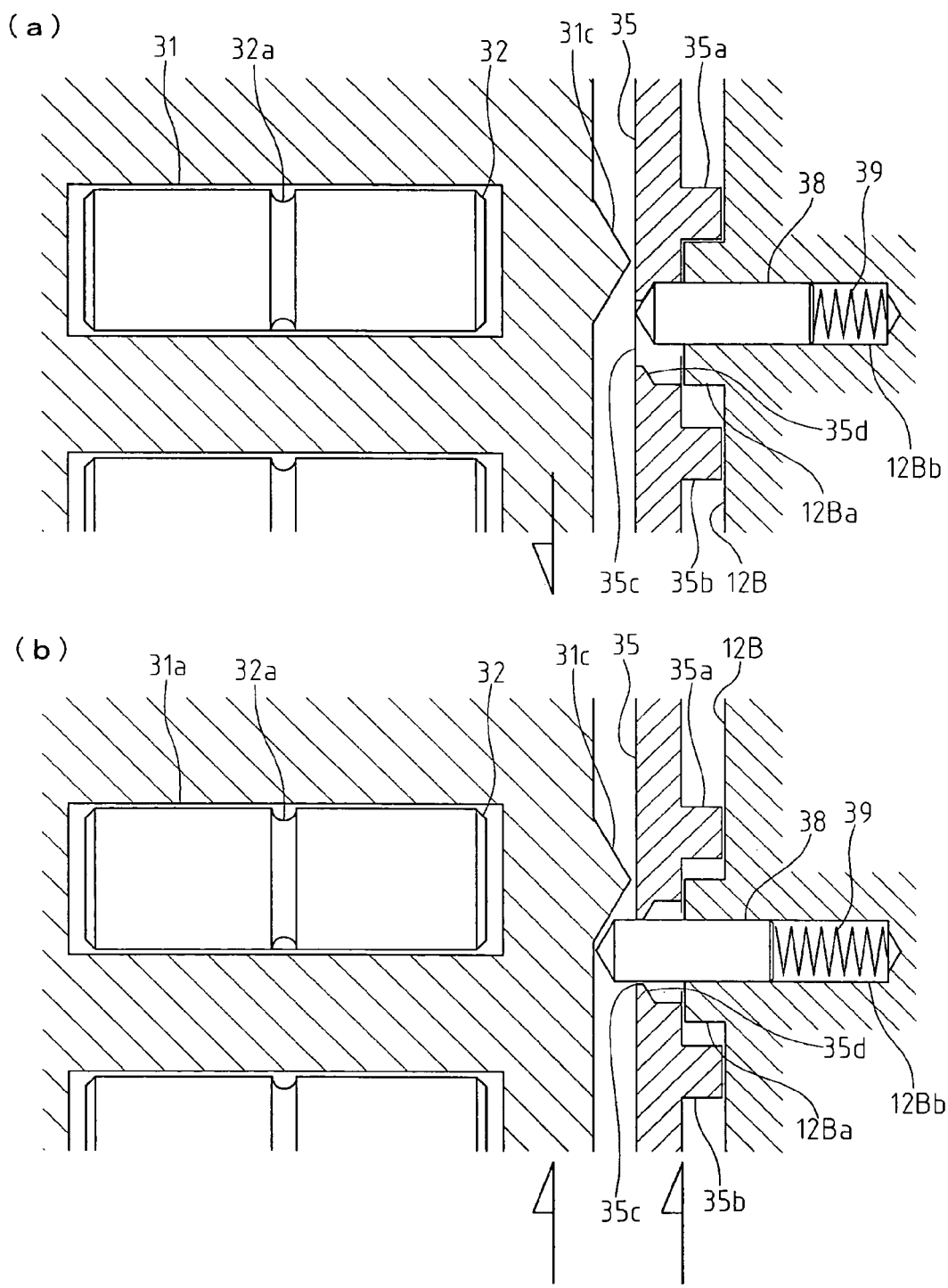
FIGS. 5(a) and 5(b) are developed sectional view of a portion of the bi-directional clutch of FIG. 1 including a forcible engaging member and a receiving portion formed on the cage, showing relation between the forcible engaging member and the receiving portion since the rotary direction of the input side rotor is reversed till the forcible engaging member comes to engage with the receiving portion so as to restrict rotation of the cage.
Figure 6:
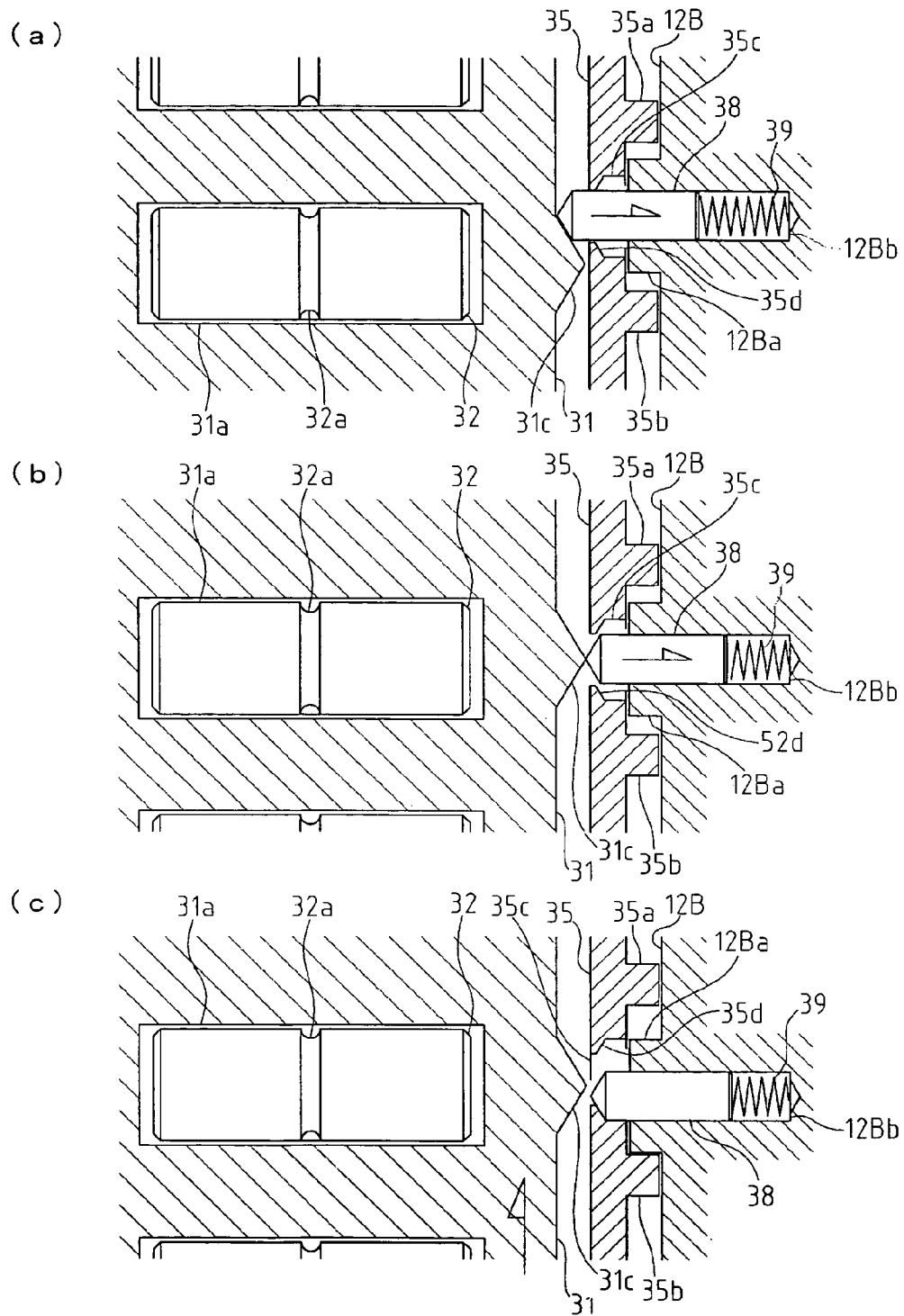
FIGS. 6(a), 6(b) and 6(c) are developed sectional views of the same portion of FIGS. 5(a) and 5(b), showing the relation between the forcible engaging member and the receiving portion subsequent to the state of FIG. 5(b), till the forcible engaging member having engaged with the receiving portion is separated from the receiving portion so as to cancel the rotation-restriction of the cage.

Ring gear shaft 27 is a hollow shaft. Left and right differential output shafts 13, serving as output side rotors of bi-directional clutch 11, are coaxially disposed inside ring gear shaft 27. As shown in FIG. 3 and others, an annular space 30 is provided between an inner peripheral cam surface 27a of ring gear shaft 27 and outer peripheral surfaces of differential output shafts 13. The outer peripheral surfaces of differential output shafts 13 disposed on the inner periphery of annular space 30 are circular when sectionally viewed in the axial direction of differential output shafts 13. Inner peripheral cam surface of ring gear shaft 27 disposed on the outer periphery of annular space 30 is regularly polygonal when sectionally viewed in the axial direction of differential output shafts 13. Annular space 30 has the maximum radial distance from the outer peripheral surfaces of differential output shafts 13 at each of corners of the sectional regular polygonal shape of inner peripheral cam surface 27a of ring gear shaft 27. Wedge-shaped gaps 30a are disposed at opposite adjacent sides of each corner of the sectional regular polygonal shape of inner peripheral cam surface 27a of ring gear shaft 27. Each wedge-shaped gap 30a is formed so that, as a position in each wedge-shaped gap 30a becomes farther from the corner of the polygon of inner peripheral cam surface 27a in the peripheral direction of differential output shafts 13, a distance of each wedge-shaped gap 30a between inner peripheral cam surface 27a of ring gear shaft 27 and the outer peripheral surfaces of differential output shafts 13 is gradually reduced.

Cylindrical cage 31 is disposed in annular space 30 between ring gear shaft 27 and left and right differential output shafts 13. Cage 31 includes openings 31a disposed at regular intervals in the peripheral direction so as to face left and right differential output shafts 13. Cage 31 is constructed by joining left and right divisional parts. The left part of cage 31 holds rollers 32 facing left differential output shaft 13, and the right part of cage 31 holds rollers 32 facing right differential output shaft 13. In annular space 30, each of the positions having the maximum radial length between differential output shaft 13 and each corner of the sectional regular polygonal shape of inner peripheral cam surface 27a of ring gear shaft 27 and between adjoining wedge-shaped gaps 30a is provided as a neutral position for each roller 32. When the relative rotary speed of differential output shafts 13 to ring gear shaft 27 is larger than a certain value, rollers 32 are disposed at the neutral positions in annular space 30, as shown in FIG. 3, where rollers 32 can be separated from inner peripheral cam surface 27a of ring gear shaft 27, because the diameter of roller 32 is smaller than the maximum radial length of annular space 30. When the relative rotary speed of differential output shafts 13 to ring gear shaft 27 becomes lower than the certain value, and as the relative rotary speed is reduced, roller 32 moves in wedge-shaped gap 30a away from the neutral position, so that the gap between roller 32 and inner peripheral cam surface 27a of ring gear shaft 27 is narrowed, and roller 32 is finally wedged between the outer peripheral surface of differential output shaft 13 and inner peripheral cam surface 27a of ring gear shaft 27, as shown in FIGS. 4(a) and 4(b).

Each roller 32 is peripherally formed at the axially middle portion thereof with an annular groove 32a. A ring-shaped biasing member 33 is peripherally provided on each differential output shaft 13 and fitted into respective annular grooves 32a of rollers 32, so as to radially bias rollers 32 toward inner peripheral cam surface 27a of ring gear shaft 27, thereby ensuring engagement of rollers 32 to ring gear shaft 27. In this way, rollers 32 are held by cage 31 so as to engage or disengage with and from inner peripheral cam surface 27a of ring gear shaft 27 and the outer peripheral surfaces of differential output shafts 13.

Figure 2:
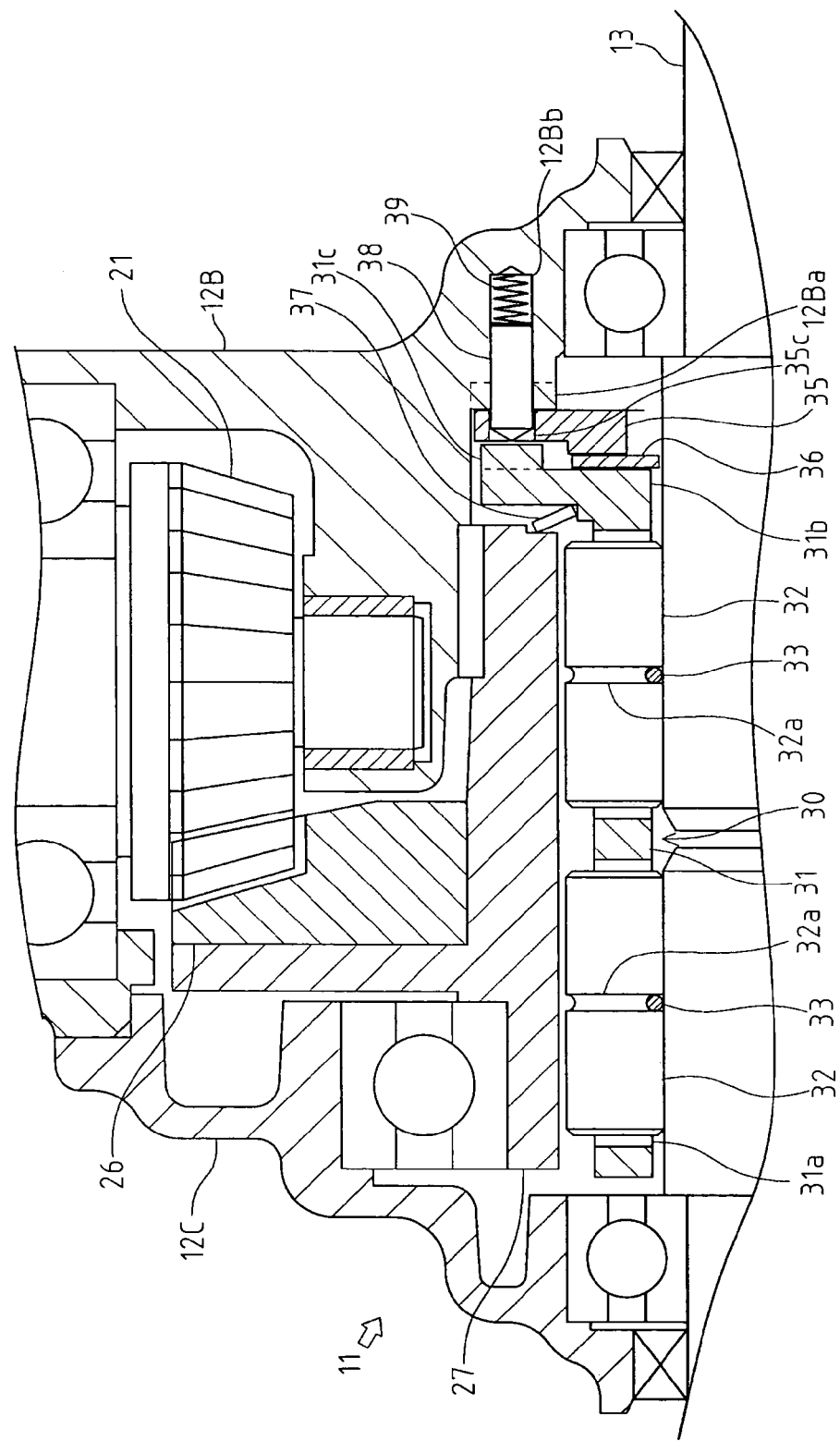
FIG. 2 is a fragmentary enlarged view of the differential gear unit with the bi-directional clutch of FIG. 1.

Referring to FIGS. 1, 2 and others, the cage 31 is formed at one axial end portion thereof with a flange 31b outside ring gear shaft 27 and inside front-wheel differential gear casing 12. A retainer 35 is disposed outside flange 31b so as to be rotatable relative to front-wheel differential gear casing 12. A friction disc 36 is disposed between an axially inside surface of retainer 35 and an axially outside surface of flange 31b. A spring 37 is interposed between an axially inside surface of flange 31b and an axial end surface of ring gear shaft 27. Therefore, cage 31 is frictionally and relatively rotatably pressed against ring gear shaft 27 and retainer 35, so that cage 31 is rotatable following ring gear shaft 27, and retainer 35 is rotatable following cage 31.

Referring to FIGS. 5(a), 5(b), 6(a), 6(b) and 6(c), pairs of projections 35a and 35b are formed on an axial outside surface of retainer 35 at regular intervals in the peripheral direction of retainer 35. Convexes 12Ba are formed on an axial inside surface of second casing part 12B so as to project toward the axial outside surface of retainer 35. Each convexes 12Ba is disposed between each pair of projections 35a and 35b, and has a length in the rotational direction of retainer 35, which is smaller than the span between the pair of projections 35a and 35b. Consequently, when the rotation of retainer 35 is reversed, each convex 12Ba having abutted against one of the projections 35a and 35b moves following cage 31 toward the other projection 35b or 35a, and finally abuts against the other projection 35b or 35a, thereby stopping retainer 35. In this way, the rotation of retainer 35 following the rotation of cage 31 is limited within the range between the pair of projections 35a and 35b.

Second casing part 12B is bored with recesses 12Bb each of which is opened at the surface of each convex 12Ba facing the axial outside surface of retainer 35. A forcible engaging pin 38 is axially slidably fitted into each recess 12Bb through a spring 39. Retainer 35 includes grooves 35c each of which is disposed between each pair of projections 35a and 35b and opened in correspondence to each recess 12Bb. Forcible engaging pins 38, biased by springs 39, project at tip portions thereof to retainer 35, and are inserted into respective grooves 35c.

Grooves 35c are extended in the peripheral direction of retainer 35 so as to allow forcible engaging pin 38 therein to move relative to retainer 35 to some degree. Each groove 35c is formed with opposite shoulders 35d toward projections 35a and 35b on the opposite sides of groove 35c. Shoulders 35d are sloped so as to fit to a peripheral surface of the conic tip of each forcible engaging pin 38. Each groove 35c includes a pair of opposite shoulders 35d in the peripheral direction of retainer 35 and a penetrating hole between opposite shoulders 35d. The penetrating hole is substantially diametrically as large as forcible engaging pin 38, and opened toward flange 31b of cage 31. Due to the rotation of retainer 35 relative to second casing part 12B (front-wheel differential gear casing 12), each of forcible engaging pins 38 can be inserted into the penetrating hole in each groove 35c, as shown in FIGS. 5(b), 6(a) and 6(b), and further, can project out through the penetrating hole to flange 35, as shown in FIGS. 5(b) and 6(a), so that forcible engaging pins 38 passed through the penetrating holes prevent retainer 35 from rotating relative to second casing part 12B because of the substantially diametrical coincidence of forcible engaging pin 38 with the penetrating hole. Unless forcible engaging pins 38 are inserted into the penetrating holes in grooves 35c, each of forcible engaging pins 38 can be disposed to fit one of opposite shoulders 35d in each groove 35c, as shown in FIGS. 5(a) and 6(c), thereby allowing the rotation of retainer 35 relative to second casing part 12B.

Cage 31 is formed on the axial outside surface of flange 31b with triangular projections 31c at regular intervals in the peripheral direction of cage 31. Projections 31c serve as receiving portions for receiving respective forcible engaging pins 38 thrust out from retainer 35 to flange 31b. Each triangular projection 31c is gradually narrowed toward its tip end facing retainer 35 so as to have sloped surfaces to be fitted to the surface of a conic tip of forcible engaging pin 38. When forcible engaging pins 38 project out from retainer 35 toward flange 31b, retainer 35 is prevented from rotating relative to second casing part 12B (front-wheel differential gear casing 12), however, projections 35a and 35b of retainer 35 are spaced from each convex 12Ba, as shown in FIG. 5(b). In this state, as cage 31, with projections 31c fitting the tips of forcible engaging pins 38 as shown in FIG. 6(a), rotates in a direction to press projections 31c against the tips of forcible engaging pins 38, the tip of each forcible engaging pin 38 slide along the sloped surface of each projection 31c against the force of spring 39, and is withdrawn into a peripherally long portion of groove 35c between shoulders 35d behind the penetrating hole, as shown in FIG. 6(b), thereby allowing retainer 35 to rotate relative to second casing part 12B as far as the gap between each convex 12Ba and projection 35a or 35b allows. Afterward, as cage 31 rotates following ring gear shaft 27, retainer 35 rotates following cage 31 so that the tip of each forcible engaging pin 38 comes to abut against one of the opposite shoulders 35d, and slides along the slope of the shoulder 35d so as to be separated from corresponding projection 31c. Finally, projection 35a or 35b abut against each convex 12Ba, as shown in FIG. 6(c), thereby preventing retainer 35 from rotating relative to second casing part 12B.

Bi-directional clutch 11 configured as the above serves as the front-wheel differential gear device in the vehicle shown in FIG. 22. When the vehicle travels normally, rollers 32 held in cage 31 abut against the outer peripheral surfaces of differential output shafts 13. FIG. 4(a) is now referred to as the state of bi-directional clutch 11 during the travel of the vehicle, where the speed relation between ring gear shaft 27 and differential output shafts 13 is opposite to that described as follows. While ring gear shaft 27 rotates counterclockwise, i.e., in a direction designated by a solid arrow in FIG. 4(a), the rotation of cage 31 is delayed after the rotation of ring gear shaft 27 because of its frictional pressure against retainer 35. Therefore, rollers 32, between inner peripheral cam surface 27a of ring gear shaft 27 and the outer peripheral surfaces of differential output shafts 13, are disposed after the corresponding neutral positions and adjacent to corresponding wedge-shaped gaps 30a in the rotational direction, thereby restricting differential output shafts 13 from rotating clockwise, i.e., opposite to the rotation of ring gear shaft 27.

During the normal travel of the vehicle in this state, bi-directional clutch 11 is set in the condition that the rotation of differential output shafts 13 depending on grounding wheels 16 agrees in direction with the rotation of ring gear shaft 27 depending on the driving power of engine 1, however, is relatively faster than the rotation of ring gear shaft 27 depending on the engine power. Therefore, rollers 32 move forward in the rotational direction away toward the neutral positions because of their abutting against the outer peripheral surfaces of differential output shafts 13, thereby being separated forward from corresponding wedge-shaped gaps 30a after the neutral position in the rotational direction, i.e., separated from ring gear shaft 27. Consequently, bi-directional clutch 11 is clutched off, so that differential output shafts 13 rotate freely from ring gear shaft 27, whereby the vehicle travels in the two-wheel drive mode where front wheels 16 rotate freely from the drive power of engine 1.

Referring to FIG. 4(a), a rotation speed Rs of ring gear shaft 27 becomes relatively lower than a rotation speed Os of differential output shafts 13, as designated by respective arrows having corresponding lengths, because of an abnormal travel condition of the vehicle, such as slipping of rear wheels 5, or another reason of slowing down the drive wheels. In this state, the rotation of rollers 32 abutting against differential output shafts 13 are further delayed after the rotation of ring gear shaft 27, so that rollers 32 are wedged into wedge-shaped gap 30a between the outer peripheral surfaces of differential output shafts 13 and inner peripheral cam surface 27a of ring gear shaft 27, thereby drivingly connecting ring gear shaft 27 to differential output shafts 13. Consequently, bi-directional clutch 11 is clutched on so as to transmit the engine power to front wheels 16, whereby the vehicle travels in the four-wheel drive condition for overcoming the abnormal condition.

In this state, cage 31 with rollers 32 rotates following ring gear shaft 27 and differential output shafts 13 while receiving the friction force against unrotatable front-wheel differential gear casing 12. Referring to FIG. 5(a), either projections 35a or 35b abut against respective convexes 12Ba so as to prevent retainer 35 from rotating relative to front-wheel differential gear casing 12. Forcible engaging pins 38 are fitted on shoulders 35d in grooves 35c so as to be prevented from projecting out from retainer 35 toward flange 31b of cage 31, thereby preventing cage 31 from rotating relative to retainer 35. Therefore, the rotation of bi-directional clutch 11 that is clutched on is free from forcible engaging pins 38 so as to keep the four-wheel drive condition of the vehicle.

The above-mentioned switching pattern of bi-directional clutch 11 for setting the vehicle into either the two-wheel drive mode or the four-wheel drive mode is constant regardless of whether the vehicle travels forward or backward. In bi-directional clutch 11, each pair of wedge-shaped gaps 30a are disposed at opposite adjacent sides, i.e., forward and backward in the rotational direction, of each corner of the sectional regular polygonal shape of inner peripheral cam surface 27a of ring gear shaft 27. Due to this arrangement, when the delay of differential output shafts 13 relative to ring gear shaft 27 causes during the forward travel of the vehicle, rollers 32 are wedged between ring gear shaft 27 and differential output shafts 13 at one side wedge-shaped gaps 30a each of which is disposed backward of each corner of the polygonal shape of inner peripheral cam surface 27a in the forward-traveling rotational direction of cage 31. When the same delay causes during the backward travel of the vehicle, rollers 32 are wedged at the other side wedge-shaped gaps 30a each of which is disposed backward of each corner of the polygonal shape of inner peripheral surface 27a in the backward-traveling rotational direction of cage 31. In this way, whether the vehicle travels forward or backward, the wedging-engagement of the ring gear shaft 27 and the differential output shafts 13 can be performed for establishing the four-wheel drive mode.

Hereinafter, wedge-shaped gaps 30a disposed backward of the respective corners of the polygonal shape of inner peripheral cam surface 27a in either of the opposite rotational directions of cage 31 are referred to as "backward wedge-shaped gaps 30a", and wedge-shaped gaps 30a opposite to backward wedge-shaped gaps 30a with respect to the respective corners of the polygonal shaped of inner peripheral shape of inner peripheral surface 27a are referred to as "forward wedge-shaped gaps 30a".

When the output rotational direction of transmission 2 (see FIG. 22) is reversed, wedge-shaped gaps 30a, having been backward wedge-shaped gaps 30a before the reversing, are turned into forward wedge-shaped gaps 30a with respect to the rotational direction of after the reversing. Namely, when the travel direction of the vehicle traveling in the two-wheel drive mode is reversed, the rotational direction of ring gear shaft 27, left and right differential output shaft 13 and cage 31 is reversed smoothly while keeping the non-wedge state, i.e., the separation state of ring gear shaft 27 from differential output shafts 13.

However, in some cases, e.g., when the backward traveling vehicle comes to ascend a slope, rotation speed Rs of ring gear shaft 27 becomes greatly larger than rotation speed Os of differential output shafts 13, as shown in FIG. 4(a), so that the rotation of ring gear shaft 27 applies excessively large stress onto rollers 32 wedged between ring gear shaft 27 and differential output shafts 13, i.e., torque is confined therebetween. Once the torque-confinement occurs, leaving the rotation restriction means including forcible engaging pins 38 out of consideration, even if the vehicle having ascended the slope by backward traveling starts descending the slope by forward traveling, i.e., even if the rotational direction of ring gear shaft 27 is reversed so that wedge-shaped gaps 30a having been backward wedge-shaped gaps 30a at which rollers 32 have been wedged become forward wedge-shaped gaps 30a and rotation speed Rs of ring gear shaft 27 becomes relatively lower than rotation speed Os of differential output shafts 13, as shown in FIG. 4(b), rollers 32 cannot be released from these forward wedge-shaped gaps 30a between inner cam surface 27 of ring gear shaft 27 and the outer peripheral surfaces of differential output shafts 13, i.e., the wedging-engagement of ring gear shaft 27 and differential output shafts 13 cannot be canceled. Namely, once the torque-confinement occurs, the vehicle cannot travel in the effective and economical two-wheel drive mode even after the traveling direction is reversed.

In bi-directional clutch 11, this problem is solved by the rotation restriction means including forcible engaging pins 38. Immediately after the rotational direction of ring gear shaft 27 is reversed, the rotation of cage 31 is temporarily stopped (restricted) so as to forcibly delay the rotation of cage 31 after ring gear shaft 27, thereby releasing rollers 32 from forward wedge-shaped gaps 30a toward backward wedge-shaped gaps 30a (after the reversing), i.e., canceling the wedging-engagement of ring gear shaft 27 and differential output shafts 13. In this way, cage 31 serves as the object to be restricted in rotation by the rotation restriction means including forcible engaging pins 38 and retainer 35, which holds forcible engaging pins 38 and are frictionally pressed against cage 31, when the rotational direction of ring gear shaft 27 is reversed.

More specifically, when the rotational direction of ring gear shaft 27 is reversed, rollers 32 are released from forward wedge-shaped gaps 30a and move backward in the rotational direction to the neutral positions in annular space 30 between inner peripheral cam surface 27a of ring gear shaft 27 and the outer peripheral surfaces of differential output shafts 13, so that cage 31 comes to rotate integrally with ring gear shaft 27. Then, retainer 35, with one side projections 35a abutting against respective convexes 12Ba as shown in FIG. 5(a), starts to rotate following cage 31 due to the frictional pressure thereof against cage 31, thereby separating projections 35a from convexes 12Ba. By further rotation of retainer 35 following cage 31, recesses 12Bb come to axially coincide with the penetrating holes of grooves 35c, as shown in FIG. 5(b), so that forcible engaging pins 38 are thrust out to flange 31b of cage 31. In this state, the rotation of retainer 35 skewered together with second casing part 12B by forcible engaging pins 38 is stopped while the possibility of rotation thereof remains as far as convexes 12Ba are spaced from the other side separations 35b. The stopped retainer 35 brakes cage 31 (i.e., restricts the rotation of cage 31) by the frictional pressure thereof against cage 31, whereby rollers 32 are released from forward wedge-shaped gaps 30a, and then come to the neutral positions backward of forward wedge-shaped gaps 30a, as shown in FIG. 4(c).

Even if the frictional pressure between cage 31 and retainer 35 is insufficient to cancel the wedge-engagement of rollers 32 between ring gear shaft 27 and differential output shafts 13, cage 31 braked by retainer 35 still rotates following differential output shafts 13 (whose rotation speed Os is relatively larger than rotation speed Rs of ring gear shaft 27) while retainer 35 is stationary, that is, relative rotation of cage 31 to retainer 35 occurs. Therefore, as shown in FIG. 6(a), triangular projections 31c formed on flange 31b of cage 31, abutting against respective forcible engaging pins 38 thrust out from retainer 35, gradually push and slide the conic tip surfaces of forcible engaging pins 38 along the slopes of projections 31c against the biasing force of springs 39 so as to withdraw forcible engaging pins 38 into grooves 35c.

Referring to FIG. 6(b), forcible engaging pins 38 pushed by projections 31c reach a position where the tip ends of forcible engaging pins 38 point onto respective apexes of triangular projections 31c. In this state, retainer 35 becomes free from forcible engaging pins 38 so as to be allowed to rotate relative to second casing part 12B. Then, retainer 35 rotates following cage 31 again until the other side projections 35b come to abut against respective convexes 12Ba, as shown in FIG. 6(c). When the rotation of retainer 35 is stopped by the abutting of projections 35b against convexes 12Ba, shoulders 35d in grooves 35c fit respective forcible engaging pins 38 so as to be prevent forcible engaging pins 38 from being thrust out from retainer 35 to flange 31b of cage 31, i.e, so as to keep the separation of forcible engaging pins 38 from respective projections 31c serving as the receiving portions for receiving forcible engaging pins 38, thereby canceling the restriction of rotation of cage 31.

In this way, even after the rotational direction of ring gear shaft 27 is reversed, bi-directional clutch 11 can be surely clutched off for ensuring the two-wheel drive mode by the temporary restriction of rotation of cage 31, which forcibly delays the rotation of cage 31 after the rotation of ring gear shaft 27 so as to surely disengage rollers 32 from inner peripheral cam surface 27a of ring gear shaft 27.

Figure 7:
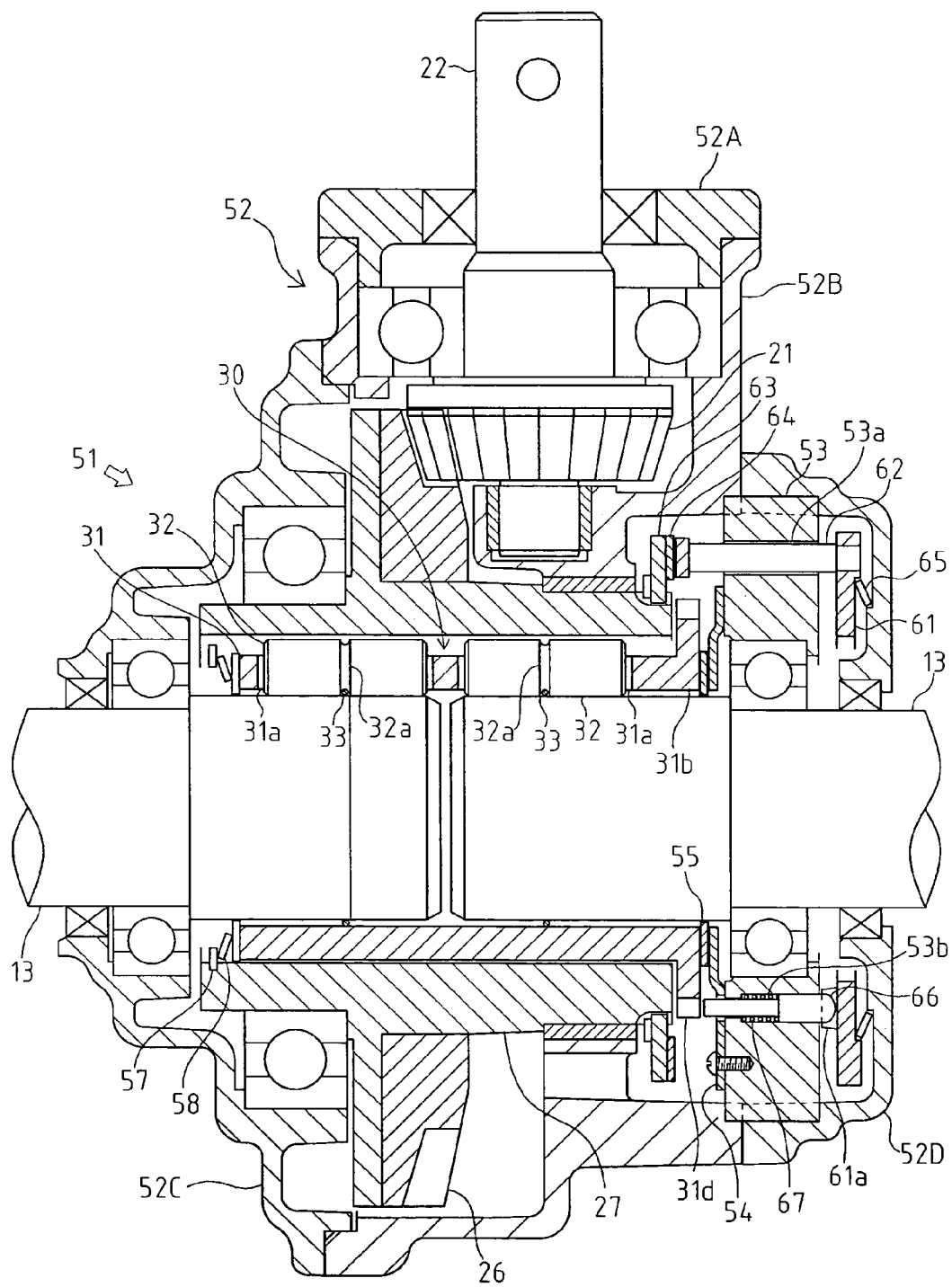
FIG. 7 is a sectional plan view of a differential gear unit with a bi-directional clutch according to a second embodiment of the invention.
Figure 8:
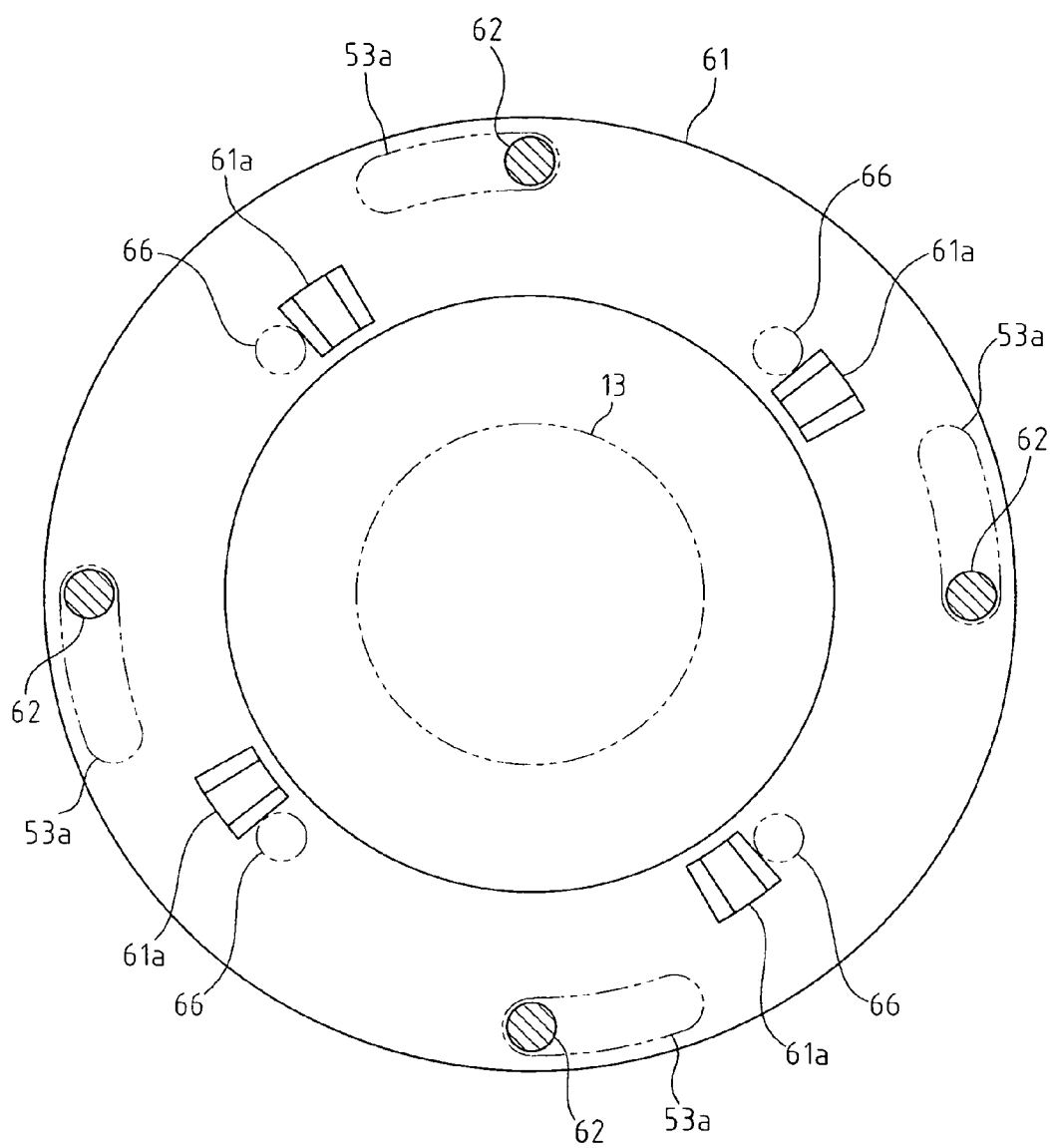
FIG. 8 is a side view of a cam member of the bi-directional clutch of FIG. 7.

Description will now be given of a differential gear unit (serving as front-wheel differential gear unit 11 when it is used for the vehicle of FIG. 22) including a bi-directional clutch 51 according to a second embodiment of the invention, with reference to FIGS. 7 and 8.

Bi-directional clutch 51, contained in a front-wheel differential gear casing 52, is substantially similar to bi-directional clutch 11 of the first embodiment, excluding structure of the rotation restriction means for restricting rotation of cage 31 when the travel direction of the vehicle is reversed. Front-wheel differential gear casing 52 is made by integrally joining a first casing part 52A, a second casing part 52B, a third casing part 52C and a fourth casing part 52D. Pinion shaft 22 with pinions 21 thereon is journalled through bearings between first and second casing parts 52A and 52B. Ring gear shaft 27 is journalled through bearings in third casing part 52C. Left and right differential output shafts 13 are journalled through respective bearings by third casing part 52C and a retainer 53, respectively, and extended outward from front-wheel differential gear casing 52.

Retainer 53 is disposed inside a joint portion of second and fourth casing parts 52B and 52D so as to not-relatively rotatably engage with casing parts 52B and 52D. Flange 31b formed on one axial end of cage 31 is excluded from ring gear shaft 27 and faces to an axial inside surface of retainer 53. A pressure disc 54 is fastened onto the axial inside surface of retainer 53, and a friction ring 55 is interposed around corresponding differential output shaft 13 between flange 31b of cage 31 and pressure disc 54. Ring gear shaft 27 is fixedly provided with a spring-retaining ring 57 on the inner peripheral surface thereof and at the end thereof opposite to retainer 53. A spring 58 is interposed between spring-retaining ring 57 and the other end of cage 31 opposite to flange 31b. In this way, cage 31 is frictionally pressed at flange 31b thereof against unrotatable retainer 53.

An annular cam plate 61 is disposed inside fourth casing part 52D and outside retainer 53 so as to be rotatable relative to differential output shafts 13. Restriction rods 62 are disposed at regular intervals in the peripheral direction of cam plate 61. Each of restriction rods 62 is fixed at one axial end thereof to cam plate 61, and extended from cam plate 61 to the vicinity of flange 31b of cage 31 through respective grooves 53a of retainer 53. A pressure plate 63 is not-relatively rotatably disposed on an axial end portion of ring gear shaft 27 facing flange 31b of cage 31 and retainer 53, and a friction plate 64 is fitted on pressure plate 63. A spring 65 is interposed between cam plate 61 and fourth casing part 52D so as to frictionally press the other axial ends of restriction rods 62 against friction plate 64, thereby frictionally and relatively rotatably pressing cam plate 61 through restriction rods 62 and pressure plate 63, i.e., thereby allowing cam plate 61 to rotate following the rotation of ring gear shaft 27.

Each of grooves 53a, axially penetrating retainer 53, is extended between opposite first and second ends in the peripheral direction of retainer 53. When cam plate 61 rotates following the rotation of ring gear shaft 27, restriction rods 62 are allowed to slide in respective grooves 53a, however, finally abut against either first or second ends of each groove 53a so as to be prevented from rotating relative to retainer 53, thereby restricting the rotation of cam plate 61 following the rotation of ring gear shaft 27. Consequently, cam plate 61, when its rotational direction is reversed, is allowed to rotate following ring gear shaft 27 within the slidable range of restriction rods 62 between the first and second ends of grooves 53a in the peripheral direction of retainer 53.

Cam plate 61 is formed on an axial inside surface thereof with cam portions 61a, which project toward retainer 53 and are disposed at regular intervals in the peripheral direction of cam plate 61. In correspondence to respective cam portions 61a, retainer 53 includes axially penetrating holes 53b through which respective forcible engaging pins 66 are axially slidably passed. Springs 67 are disposed in respective holes 53b so as to press head ends of forcible engaging pins 66 against the axial inside surface of cam plate 61. When cam plate 61 rotates following the rotation of ring gear shaft 27, the head ends of forcible engaging pins 66 ride on the respective cam portions 61a, so that forcible engaging pins 66 are pushed by respective cam portions 61a against the biasing force of springs 67, and thrust out at the opposite ends thereof from retainer 53 toward flange 31b of cage 31 through pressure plate 54.

Flange 31b of cage 31 is formed on the outer peripheral edge thereof with notches 31d which are disposed at regular intervals in the peripheral direction of cage 31 so as to serve as receiving portions for receiving respective forcible engaging pins 66 thrust out from retainer 53 toward flange 31b. When forcible engaging pins 66 ride on respective cam portions 61a of cam plate 61, the ends of forcible engaging pins 66 thrust out from retainer 53 are engaged into respective notches 31d. When forcible engaging pins 66 are pressed against the axial inside surface of cam plate 61 outside of cam portions 61a, forcible engaging pins 66 are removed from notches 31d and separated from cage 31.

Due to the above structure, when ring gear shaft 27 wedged to left and right differential output shafts 13 through rollers 32 is reversed in the rotational direction, cage 31 rotates following the reversed rotation of ring gear shaft 27, and cam plate 61 rotates following the rotation of cage 31, so that each of restriction rods 62 fixed to cam plate 61 rotates to be separated from either of the opposite ends of corresponding groove 53a. The rotation of cam plate 61 following the rotation of cage 31 is allowed before forcible engaging pins 66 ride on respective cam portions 61a so as to be engaged with cage 31 through notches 31d. During the engagement of forcible engaging pins 66 (i.e., cam plate 61) with cage 31, the rotation of cage 31 following ring gear shaft 27 is forcibly restricted so as to cancel the wedging of ring gear shaft 27 with differential output shafts 13, however, cage 31 is allowed to rotate relative to retainer 53 within the slidable range of restriction rods 62 in grooves 53a. Due to the rotation of cage 31 relative to retainer 53, forcible engaging pins 66 pass respective cam portions 61a and are disengaged from notches 31d, so that the rotation of cage 31 following the rotation of ring gear shaft 27 is allowed again, i.e., the rotation restriction of cage 31 is canceled, thereby allowing bi-directional clutch 51 to be clutched off in the reversed rotation direction.

Figure 9:
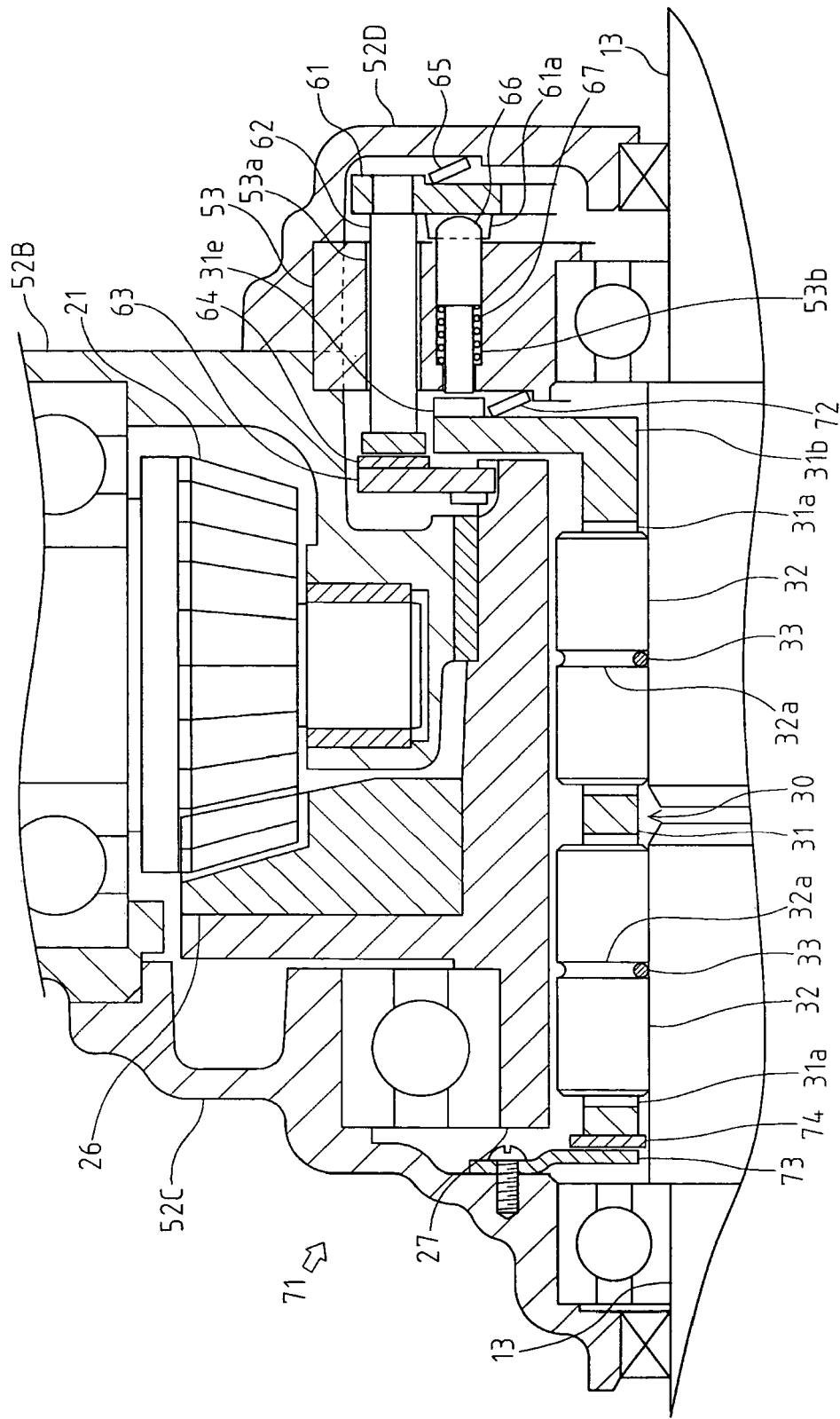
FIG. 9 is a sectional plan view of a differential gear unit with a bi-directional clutch according to a third embodiment of the invention.

Description will now be given of a differential gear unit (serving as front-wheel differential gear unit 11 when it is used for the vehicle of FIG. 22) including a bi-directional clutch 71 according to a third embodiment of the invention, with reference to FIG. 9.

Bi-directional clutch 71 disposed in front-wheel differential gear casing 52 is substantially similar to bi-directional clutch 51 of the second embodiment, excluding structure of frictional engaging means for frictionally and relatively rotatably engage cage 31 with an unrotatable portion in bi-directional clutch 71.

The frictional engaging means of bi-directional clutch 71 comprises a spring 72 and a friction plate 74. Spring 72 is interposed between unrotatable retainer 53 not-relatively rotatably engaged with front-wheel differential gear casing 52 (casing parts 52B and 52D) and flange 31b formed on one axial end of cage 31. A pressure plate 73 is fixed onto third casing part 52C serving as the unrotatable portion in bi-directional clutch 71, and friction plate 74 is pressed between pressure plate 73 and the other axial end of cage 31 due to the force of spring 72, thereby frictionally allowing cage 31 to rotate following ring gear shaft 27 relative to the unrotatable portion.

Additionally, flange 31b of cage 31 is formed with receiving portions 31e for receiving forcible engaging pins 66 when forcible engaging pins 66 ride on cam portions 61a of cam plate 61 and are thrust out from retainer 53 toward flange 31b. Receiving portions 31e are alternately projected from flange 31b toward retainer 53 and recessed for receiving forcible engaging pins 66 therein at regular intervals in the peripheral direction of cage 31 so as to correspond to respective forcible engaging pins 66. Due to the engagement of forcible engaging pins 66 with receiving portions 31e, the temporary restriction of rotation of cage 31 following the reversed rotation of ring gear shaft 27 is ensured for canceling the wedging of ring gear shaft 27 with differential output shafts 13.

Figure 10:
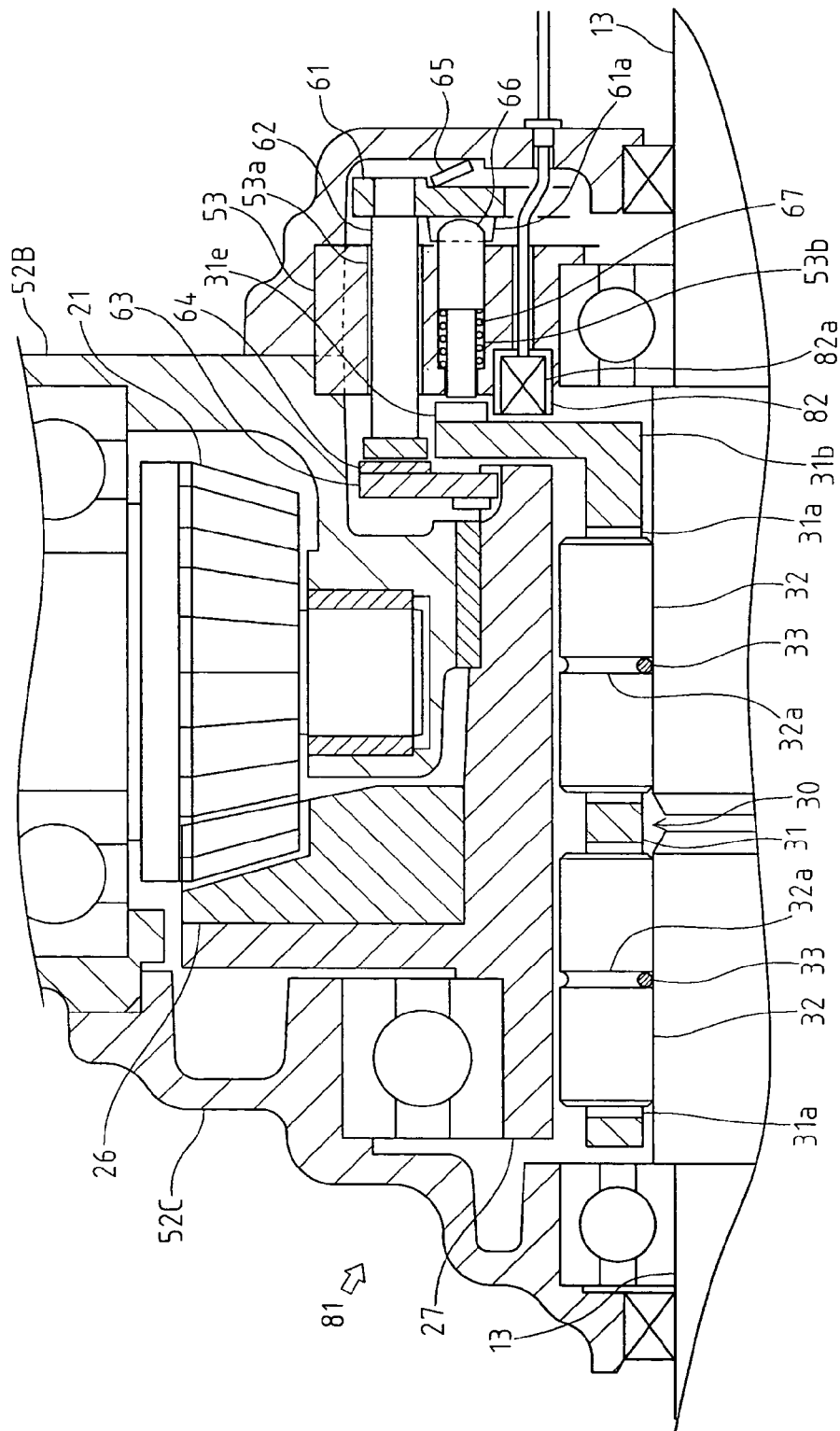
FIG. 10 is a sectional plan view of a differential gear unit with a bi-directional clutch according to a fourth embodiment of the invention.

Description will now be given of a differential gear unit (serving as front-wheel differential gear unit 11 when it is used for the vehicle of FIG. 22) including a bi-directional clutch 81 according to a fourth embodiment of the invention, with reference to FIG. 10.

Bi-directional clutch 81 disposed in front-wheel differential gear casing 52 is substantially similar to bi-directional clutch 71 of the third embodiment, excluding structure of frictional engaging means for frictionally and relatively rotatably engage cage 31 with an unrotatable portion in bi-directional clutch 81.

The frictional engaging means of bi-directional clutch 81 comprises an electromagnet 82 incorporating an electromagnetic coil 82a. Electromagnet 82 is disposed in retainer 53 so as to face flange 31b of cage 31. Retainer 53 not-relatively rotatably engaged with front-wheel differential gear casing 52 (casing parts 52B and 52D) serves as the unrotatable portion in bi-directional clutch 81. When electromagnet 82 is excited, flange 31b of cage 31 is frictionally and relatively rotatably engaged to retainer 53 through excited electromagnet 82. In other words, by unexciting electromagnet 82, cage 31 can be easily free from the frictional pressure against retainer 53. On the other hand, no frictional means is disposed between the end of cage 31 opposite to flange 31b and third casing part 52C so that the frictional rotation restriction of cage 31 relative to the unrotatable portion of bi-directional clutch 81 depends on only excitement of electromagnet 82.

Due to this structure, during the rotation of cage 31 following the reversed rotation of ring gear shaft 27 wedged with differential output shafts 13, forcible engaging pins 66 are engaged with receiving portions 31e and electromagnet 82 is excited so as to ensure the temporary rotation restriction of cage 31, and then, forcible engaging pins 66 are disengaged from receiving portions 31e so as to cancel the rotation restriction of cage 31, and further, electromagnet 82 is unexcited so as to ensure the rotation of cage 31 free from retainer 53, thereby smoothly clutching off bi-directional clutch 81.

Figure 11:
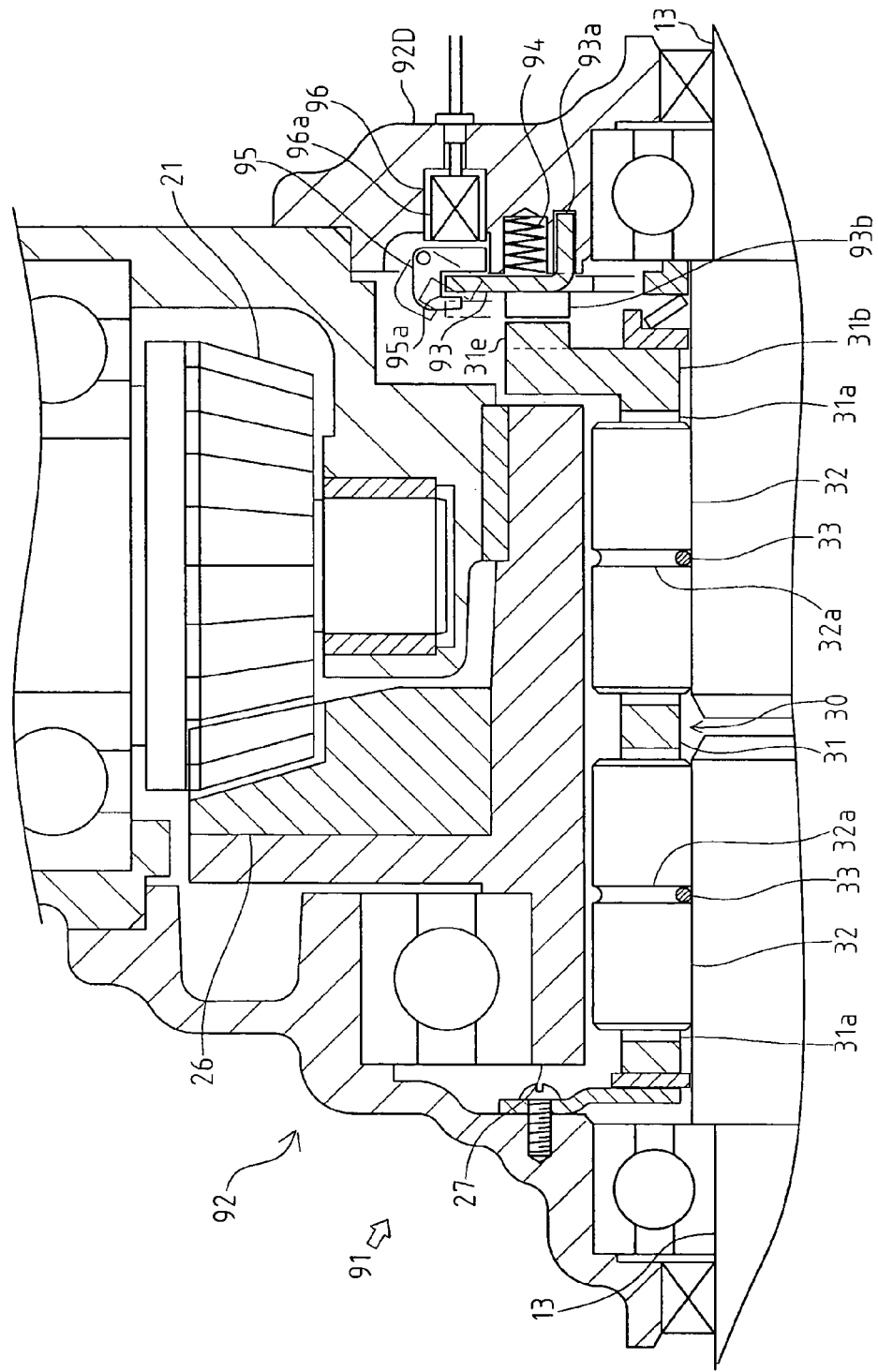
FIG. 11 is a sectional plan view of a differential gear unit with a bi-directional clutch according to a fifth embodiment of the invention.

Description will now be given of a differential gear unit (serving as front-wheel differential gear unit 11 when it is used for the vehicle of FIG. 22) including a bi-directional clutch 91 according to a fifth embodiment of the invention, with reference to FIG. 11.

Bi-directional clutch 91, contained in a front-wheel differential gear casing 92, is substantially similar to bi-directional clutch 81 of the fourth embodiment, excluding structure of rotation restricting means for restricting rotation of cage 31 when the traveling direction of the vehicle is reversed. Front-wheel differential gear casing 92 is made by integrally joining a first casing part 92A, a second casing part 92B, a third casing part 92C and a fourth casing part 92D. An annular forcible engaging plate 93 is formed with fixture portions 93a, which are not-relatively rotatably engaged to fourth casing part 92D, and disposed between fourth casing part 92D and flange 31b formed on one axial end of cage 31. Engaging portions 93b formed on an axial inside surface of forcible engaging plate 93 and receiving portions 31e formed on flange 31b of cage 31 are shaped to fit each other. A spring 94 is disposed in fourth casing part 92D and pressed against forcible engaging plate 93 so as to thrust engaging portions 93b toward flange 31b.

A retainer 95 is relatively rotatably supported on fourth casing part 92D, and recessed so as to fit an outer peripheral edge of forcible engaging plate 93. An electromagnet 96 incorporating an electromagnetic coil 96a is disposed in fourth casing part 92D so as to face retainer 95. When electromagnet 96 is excited, retainer 95 is adsorbed to electromagnet 96 and engaged to forcible engaging plate 93 so as to disengage engaging portions 93b from receiving portions 31e. When electromagnet 96 is unexcited, retainer 95 is released from electromagnet 96, and rotated to push forcible engaging plate 93 to flange 31b by the force of spring 94, so as to engage engaging portions 93b with receiving portions 31e.

The control of electromagnet 96 is automatically performed depending on whether or not the rotational direction of ring gear shaft 27 is reversed and whether or not ring gear shaft 27 is wedged with differential output shafts 13. Electromagnet 96 is excited so as to release engaging portions 93b from receiving portions 31e, i.e., to release cage 31 from forcible engaging plate 93 unless the rotational direction of ring gear shaft 27, while being wedged with differential output shafts 13, is reversed. Once the rotational direction of ring gear shaft 27 wedged with differential output shafts 13 is reversed, electromagnet 96 having been excited is unexcited so as to engage engaging portions 93b with receiving portions 31e, i.e., to restrict the rotation of cage 31 following ring gear shaft 27, and then, excited again so as to release cage 31 from forcible engaging plate 93, thereby allowing two-way 91 to be clutched off. For example, the vehicle shown in FIG. 22 is provided with a gearshift lever which can be shifted among a variable forward-traveling speed zone, a neutral position and a variable backward-traveling speed zone, and the automatic unexciting of electromagnet 96 is associated with the operation for shifting the gearshift lever to the neutral position.

Bi-directional clutch 91 ensures the advantageous temporary rotation restriction of cage 31 for canceling the wedging of ring gear shaft 27 with differential output shafts 13 when the rotational direction of ring gear shaft 27 is reversed. Further, in bi-directional clutch 91, the electronically controlled rotation restricting means including electromagnet 93 is simple and durable because it includes no physically abrasive member constantly frictionally pressed against cage 31 and requiring periodical maintenance.

Description will now be given of a differential gear unit (serving as front-wheel differential gear unit 11 when it is used for the vehicle of FIG. 22) including a bi-directional clutch 111 according to a sixth embodiment of the invention, with reference to FIGS. 12 to 20.

Figure 12:
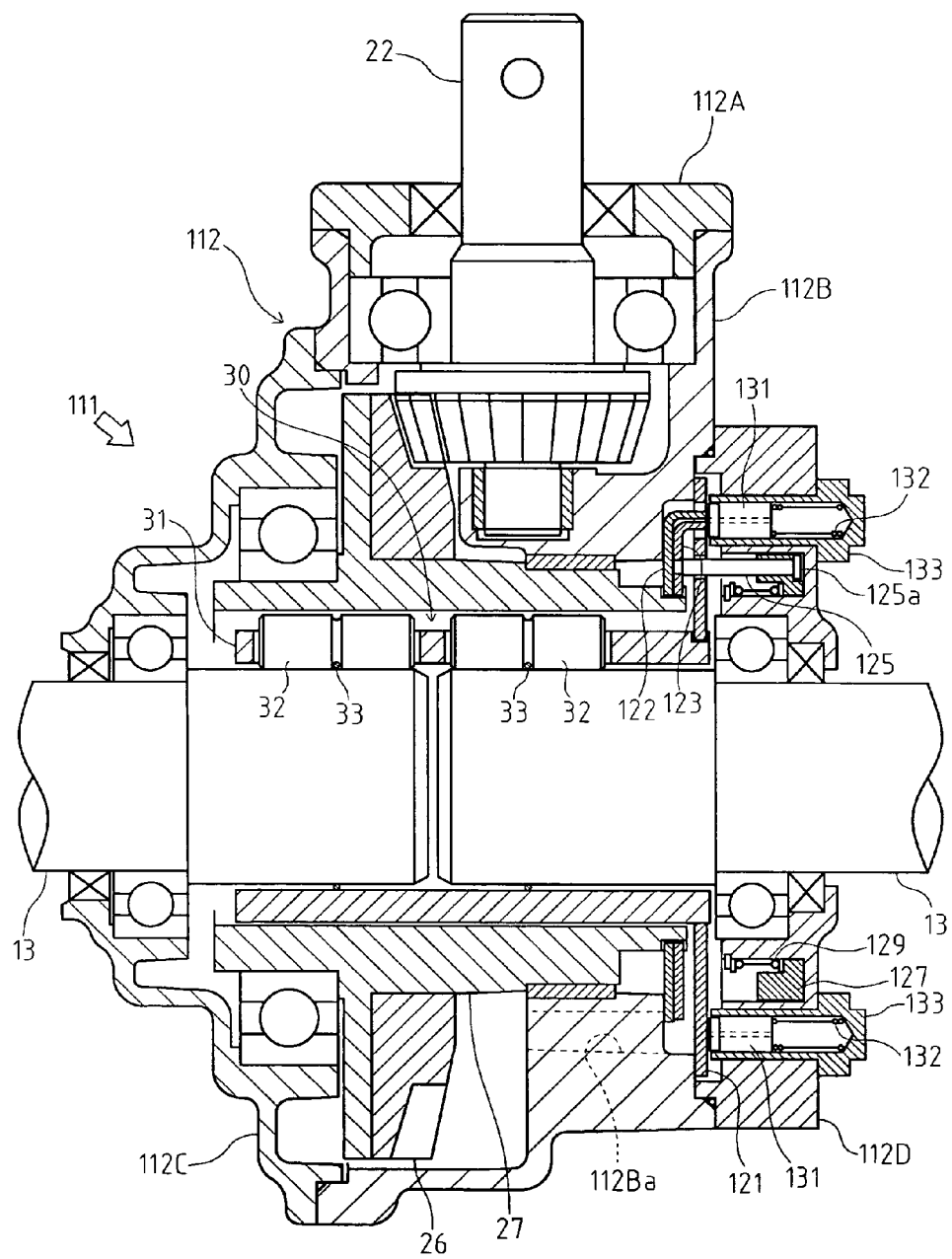
FIG. 12 is a sectional plan view of a differential gear unit with a bi-directional clutch according to a sixth embodiment of the invention.

Bi-directional clutch 111, contained in a front-wheel differential gear casing 112, is substantially similar to bi-directional clutch 11 of the first embodiment, excluding structure of rotation restricting means for temporarily restricting rotation of cage 31 when the rotational direction of ring gear shaft 27 is reversed. As shown in FIG. 12, a first casing part 112A, a second casing part 112B and a third casing part 112C are joined together so as to constitute front-wheel differential gear casing 112 incorporating bi-directional clutch 111. Pinion shaft 22 with pinion 21 thereon is journalled by first and second casing parts 112A and 112B through bearings. Ring gear shaft 27 is journalled by third casing part 112C through bearings, and ring gear 26 fixed on ring gear shaft 27 meshes with pinion 21. Left and right differential output shafts 13 are journalled by respective second and third casing parts 112B and 112C through respective bearings, and extended outward from respective second and third casing parts 112B and 112C.

Figure 13:
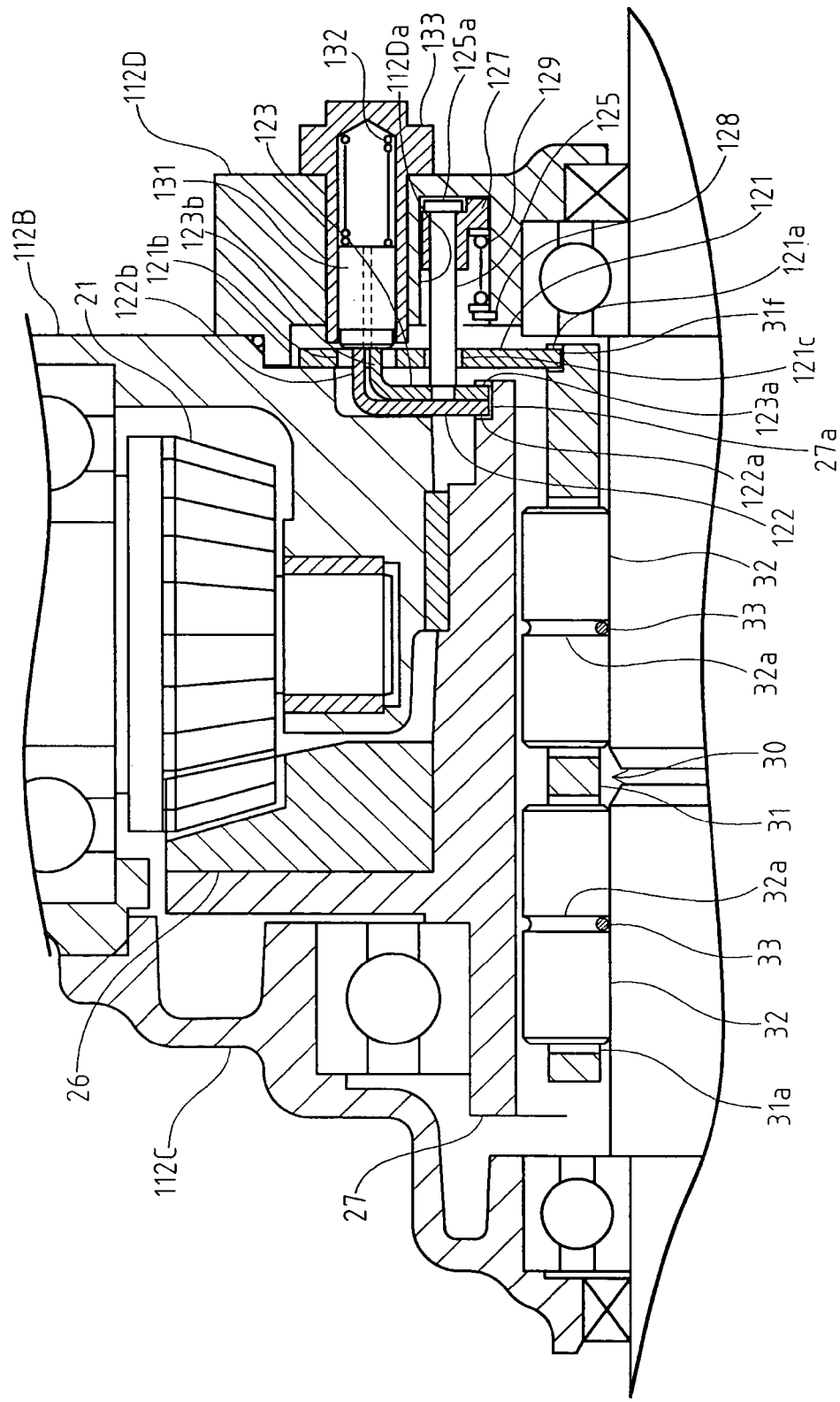
FIG. 13 is a fragmentary enlarged view of the differential gear unit with the bi-directional clutch of FIG. 12.
Figure 14:
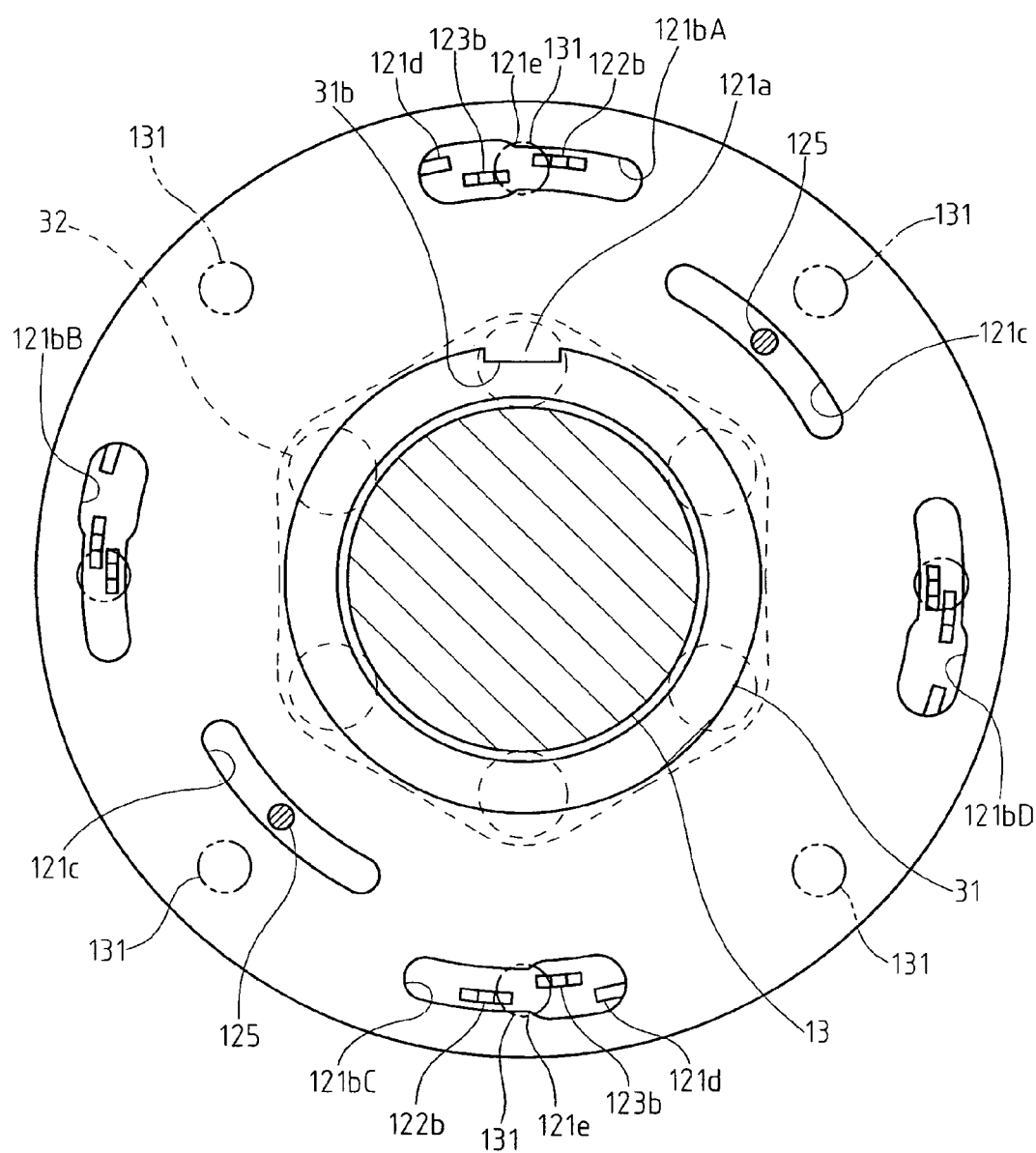
FIG. 14 is a fragmentary sectional view of the bi-directional clutch of the sixth embodiment when viewed in the axial direction of output side rotors (differential output shafts), including a side view of a first rotor provided on a cage.

As shown in FIGS. 12 and 13, an annular plate-shaped first rotor 121 is not-relatively rotatable fitted on an axial end of cage 31, and is disposed on an axial outside of ring gear shaft 27 inside fourth casing part 112D. Here, as shown in FIGS. 13 and 14, first rotor 121 is formed on an inner peripheral edge thereof with a key 121a, which is fitted into a key groove 31f formed on the outer peripheral edge of the axial end of cage 31, so that first rotor 121 is rotatable integrally with cage 31. Third casing part 112C includes an opening whose peripheral edge is joined to fourth casing part 112D and contacts an axial inside surface of an outer peripheral edge portion of first rotor 121.

As shown in FIG. 14, first rotor 121 is formed with axially penetrating grooves 121b extended along the outer peripheral edge of first rotor 121 and aligned at regular intervals in the peripheral direction of first rotor 121. First rotor 121 is also formed with axially penetrating grooves 121c, which are extended in the peripheral direction of first rotor 121, aligned at regular intervals in the peripheral direction of first rotor 121, and disposed nearer to the center axis of first rotor 121 (or differential output shafts 13) than grooves 121b. In this embodiment, grooves 121b consist of four grooves 121bA, 121bB, 121bC and 121bD aligned at approximate 90 degrees intervals, and grooves 121c consist of two grooves 121c aligned at approximate 180 degrees intervals. Preferably, grooves 121c are entirely offset from grooves 121b in the radial direction of first rotor 121.

Each groove 121b is formed with a stepped edge 121e at an intermediate portion thereof in the peripheral direction of first rotor 121, so that a wide portion of groove 121b, including stepped edge 121e and a first end of opposite ends thereof in the peripheral direction of first rotor 121, is wider in the radial direction of first rotor 121 than the remaining narrow portion of groove 121b including the other second end thereof in the peripheral direction of first rotor 121. With respect to the locative relation between the wide portion and the narrow portion in each groove 121b in the rotational direction of first rotor 121, any opposite two grooves 121b with respect to the center axis of first rotor 121 are the same, and two grooves 121*b* adjoining in the peripheral direction of first rotor 121 are opposite to each other (i.e., the first ends of adjoining grooves 121*b* face each other or the second ends of adjoining grooves 121*b* face each other). Specifically, in the rotational direction of first rotor 121, the shapes of grooves 121*b*A and 121*b*C are the same, the shapes of grooves 121*b*B and 121*b*D are the same, and the shapes of grooves 121*b*A and 121*b*C are reverse to the shapes of grooves 121*b*B and 121*b*D.

Forcible engaging pins 131 are disposed at regular intervals in the peripheral direction of first rotor 121 as later detailed, and each of forcible engaging pins 131 is diametrically smaller than the width of the wide portion of groove 121*b* in the radial direction of first rotor 121, and diametrically larger than the width of the narrow portion of groove 121*b* in the radial direction of first rotor 121. Namely, each groove 121*b* has the only wide portion through which forcible engaging pin 131 can be passed. Forcible engaging pin 131 passed through the wide portion of groove 121*b* can abut against stepped edge 121*e* of this groove 121*b* so as to be engaged with first rotor 121.

Figure 20:
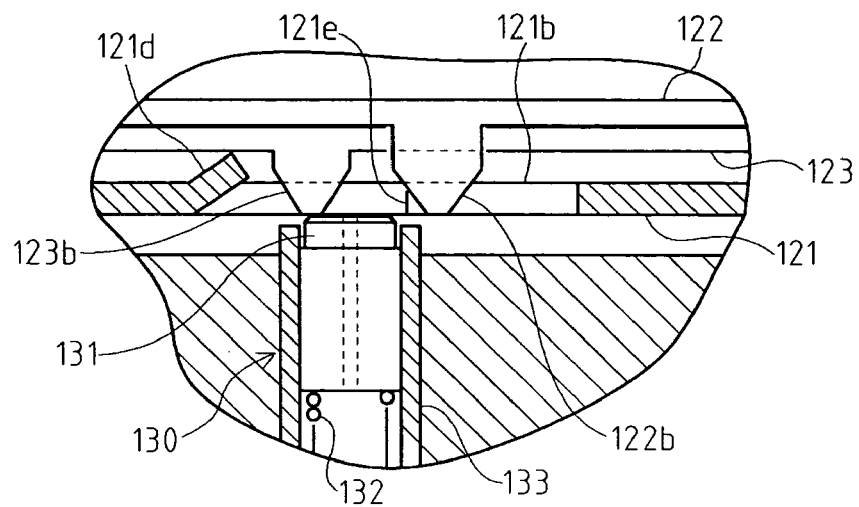
Figure 20:
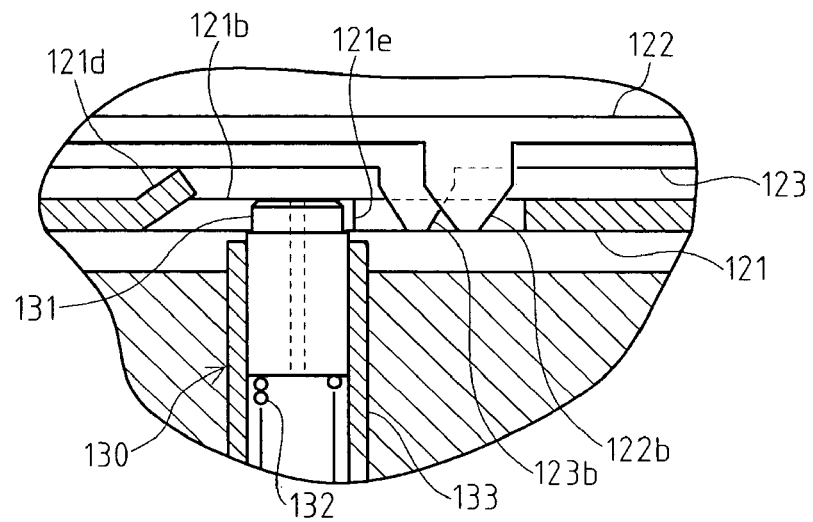
Figure 20:
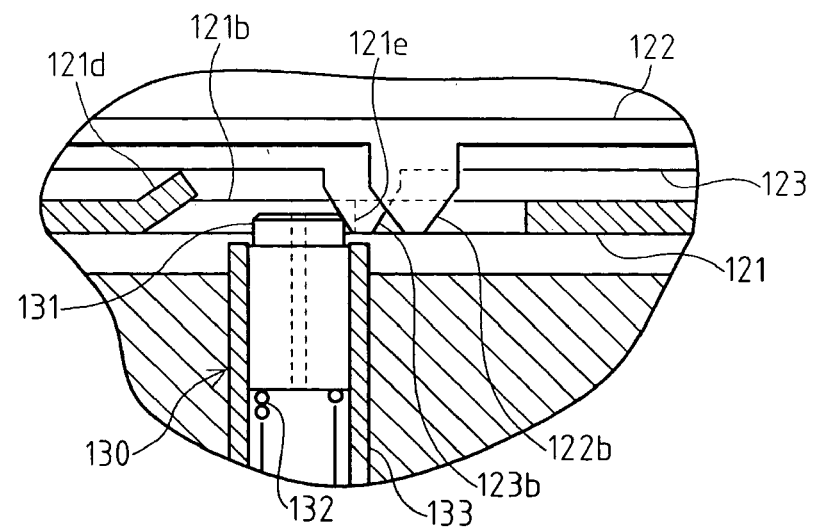

In the wide portion of each groove 121*b*, a needle 121*d* is extended from the first end of groove 121*b* toward stepped edge 121*e*, when axially viewed as shown in FIG. 14, and axially inwardly slantwise (toward a later-mentioned third rotor 123) as shown in FIGS. 20(*a*), 20(*b*) and 20(*c*). A tip of each needle 121*d* substantially reaches the axial outside surface of first rotor 121 facing third rotor 123 when sectionally viewed in the axial direction. Forcible engaging pin 131 passed through the wide portion of groove 121*b* can abut against the axially inwardly slanted slope of needle 121*d*, so that the slope of needle 121*d* guides forcible engaging pin 131 according to rotation of first rotor 121.

Figure 15:
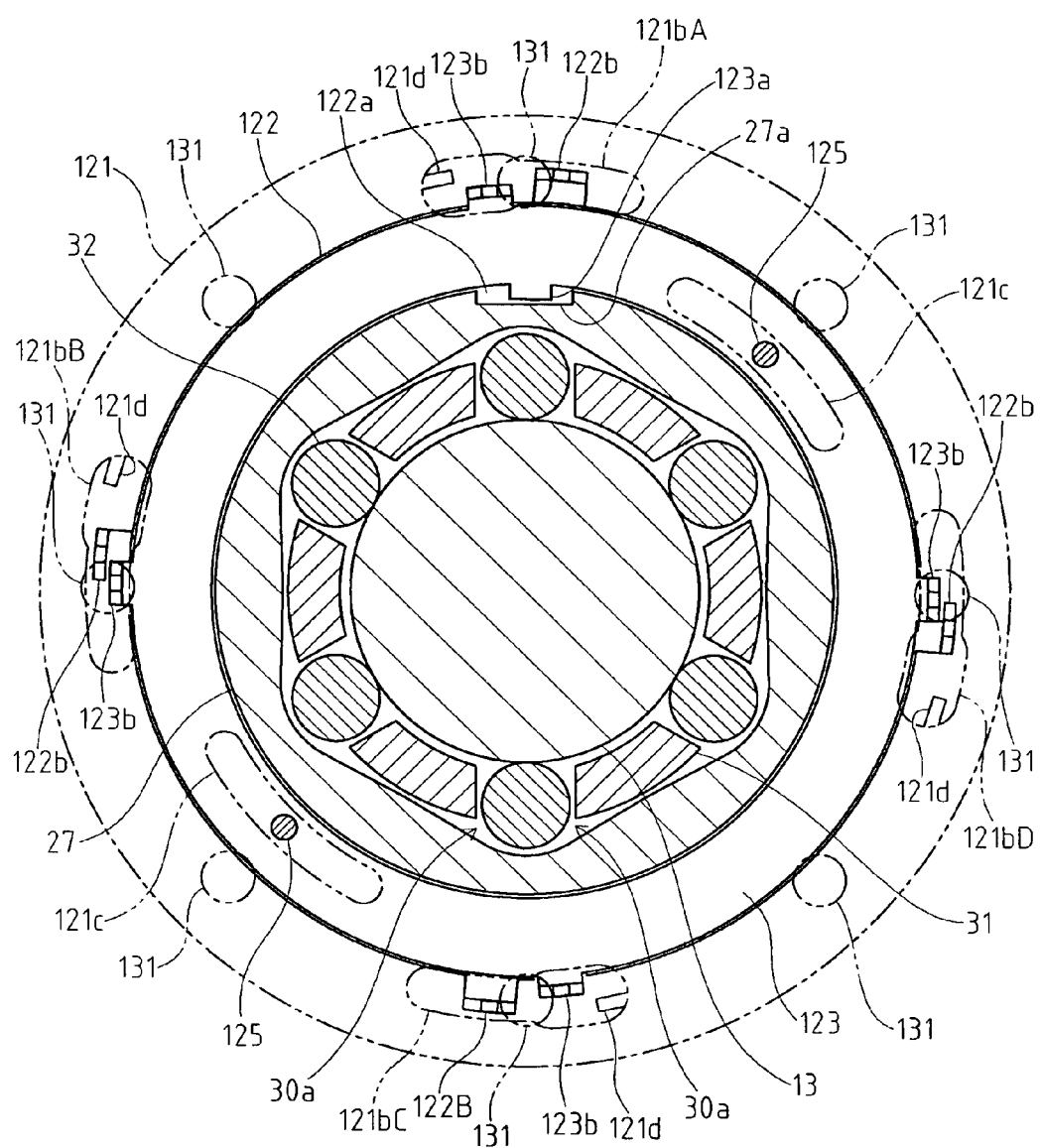
FIG. 15 is a fragmentary sectional view of the bi-directional clutch of the sixth embodiment when viewed in the axial direction of the output side rotors (the differential output shafts), including a side view of second and third rotors juxtaposed on an input side rotor.

As shown in FIGS. 12, 13 and 15, an annular plate-shaped second rotor 122 and annular plate-shaped third rotor 123 are axially juxtaposed axially inward from first rotor 121 inside second casing part 112B, and fitted onto the end of ring gear shaft 27 so as to face first rotor 121 projecting from cage 31. Here, as shown in FIGS. 13 and 15, second rotor 122 is formed on an inner peripheral edge thereof with a key 122*a*, which is not-relatively rotatably fitted into a key groove 27*a* formed on the outer peripheral edge of the axial end of ring gear shaft 27, so that second rotor 122 is rotatable integrally with ring gear shaft 27. Third rotor 123 is formed on an inner peripheral edge thereof with a key 123*a*, which is also fitted into key groove 27*a* of ring gear shaft 27. Key groove 27*a* is wider than key 123*a* in the peripheral direction of ring gear shaft 27, so that third rotor 123 is rotatable relative to ring gear shaft 27 within the slidable range of key 123*a* in key groove 27*a*. When the rotation of ring gear shaft 27 is started, the rotation of third rotor 123 delays after the rotation of ring gear shaft 27 and second rotor 122 before key 123*a* abuts against one of opposite ends of key groove 27*a*. Once key 123*a* abuts against the end of key groove 27*a*, third rotor 123 rotates integrally with ring gear shaft 27 and second rotor 122.

Restriction rods 125 are fixed on an axial outside surface of third rotor 123 at regular intervals in the peripheral direction of third rotor 123, and extended axially outward from third rotor 123 in parallel to differential output shaft 13 into an axially inwardly opened annular recesses 112Da formed in fourth casing part 112D around differential output shaft 13 through respective grooves 121*c* of first rotor 121. The length of each groove 121*c* through which restriction rod 125 is passed is sufficient to ensure the rotation of third rotor 123 relative to ring gear shaft 27 and second rotor 122 depending on the slide of key 123*a* in key groove 27*a*.

A pressure member 127 is axially slidably fitted in recess 112Da, and restriction rods 125 are relatively axially slidably passed through pressure member 127. In recess 112Da, a head 125*a* of each restriction rod 125 is diametrically expanded so as to prevent pressure member 127 from escaping from restriction rod 125. In recess 112Da, a stopper ring 128 is fixed on an inner peripheral edge of annular recess 112Da, and a spring 129 is wound between pressure member 127 and stopper ring 128 around a peripheral wall of fourth casing part 112D journaling differential output shaft 13 surrounded by recess 112Da, so as to frictionally and relatively rotatably press pressure member 129 against fourth casing part 112D serving as the unrotatable portion of bi-directional clutch 111, thereby ensuring frictionally relative rotation of third rotor 123 to fourth casing part 112D through restriction rods 125.

As shown in FIGS. 13, 14 and 15, second rotor 122 and third rotor 123 are formed with respective pawls 122*b* and pawls 123*b*, which are extended from outer peripheral edges of respective rotors 122 and 123 and inserted at tips thereof into respective grooves 121*b*. According to the rotation of second and third rotors 122 and 123 relative to first rotor 121, pawls 122*b* and 123*b* are movable in each groove 121*b* between the wide portion and the narrow portion.

As shown in FIGS. 20(*a*), 20(*b*) and 20(*c*), the portion of each of pawls 122*b* and 123*b* in each groove 121*b* is gradually narrowed toward the tip thereof so as to have symmetric slopes with respect to the tip in the peripheral direction of first rotor 121. The tip ends of pawls 122*b* and 123*b* are disposed on the same plane with the axial inside surface of first rotor 121.

Figure 16:
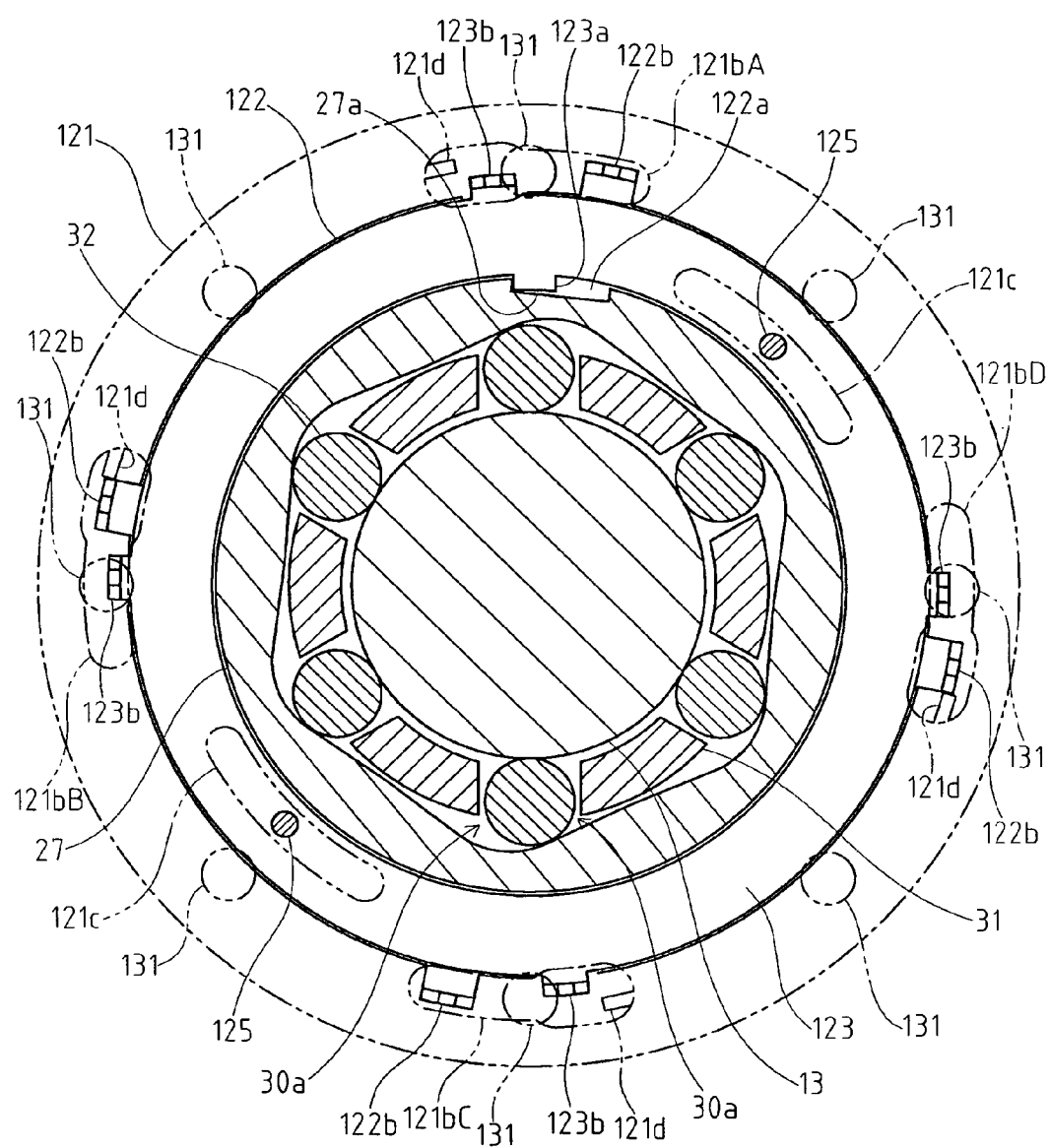
FIG. 16 is a fragmentary sectional view of the tow-way clutch of the sixth embodiment when viewed in the axial direction of the output side rotors (the differential output shafts), showing a locative relation among the first, second and third rotors during rotation of the input side rotor.
Figure 17:
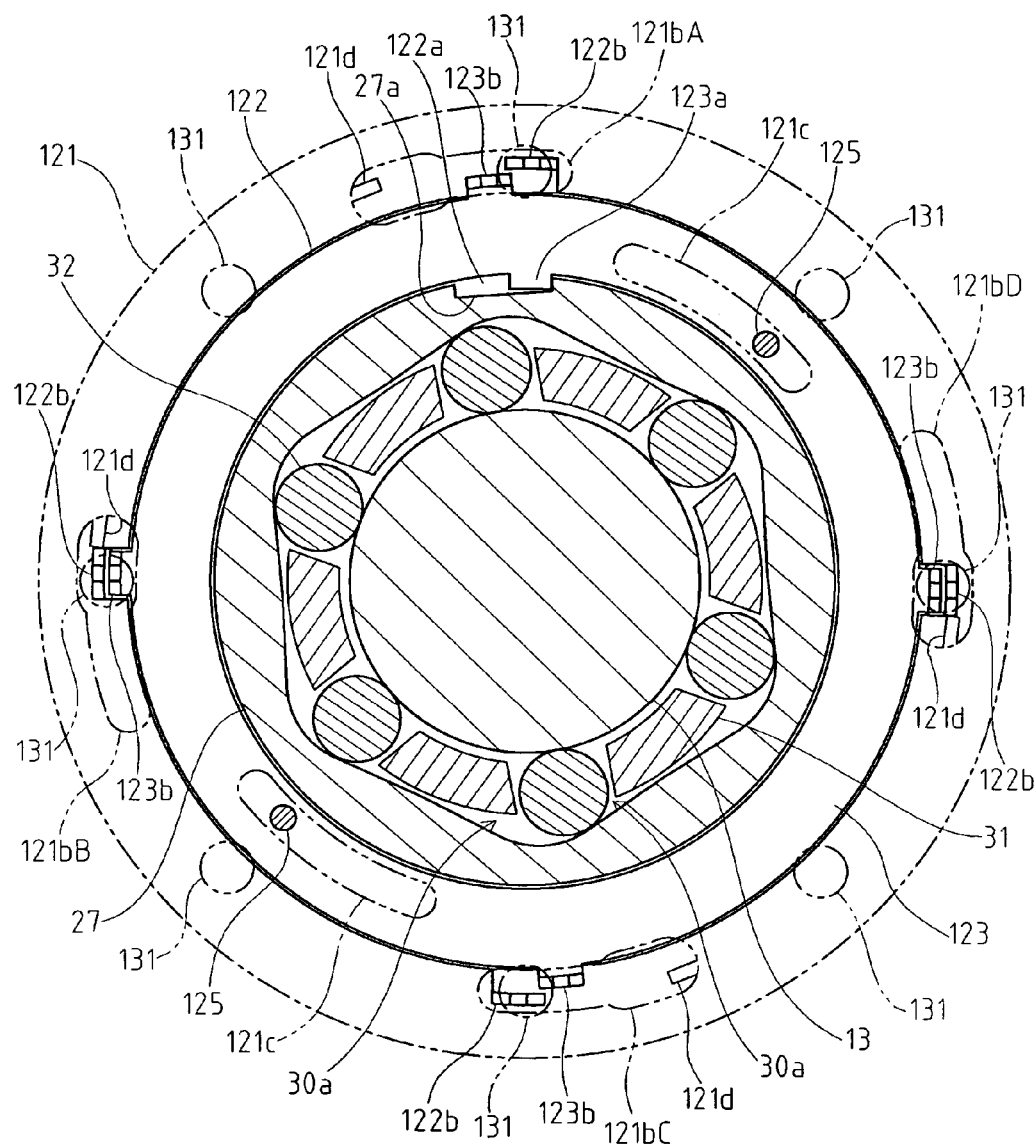
FIG. 17 is a fragmentary sectional view of the tow-way clutch of the sixth embodiment when viewed in the axial direction of the output side rotors (the differential output shafts), showing a locative relation among the first, second and third rotors immediately after the rotational direction of the input side rotor is reversed.
Figure 18:
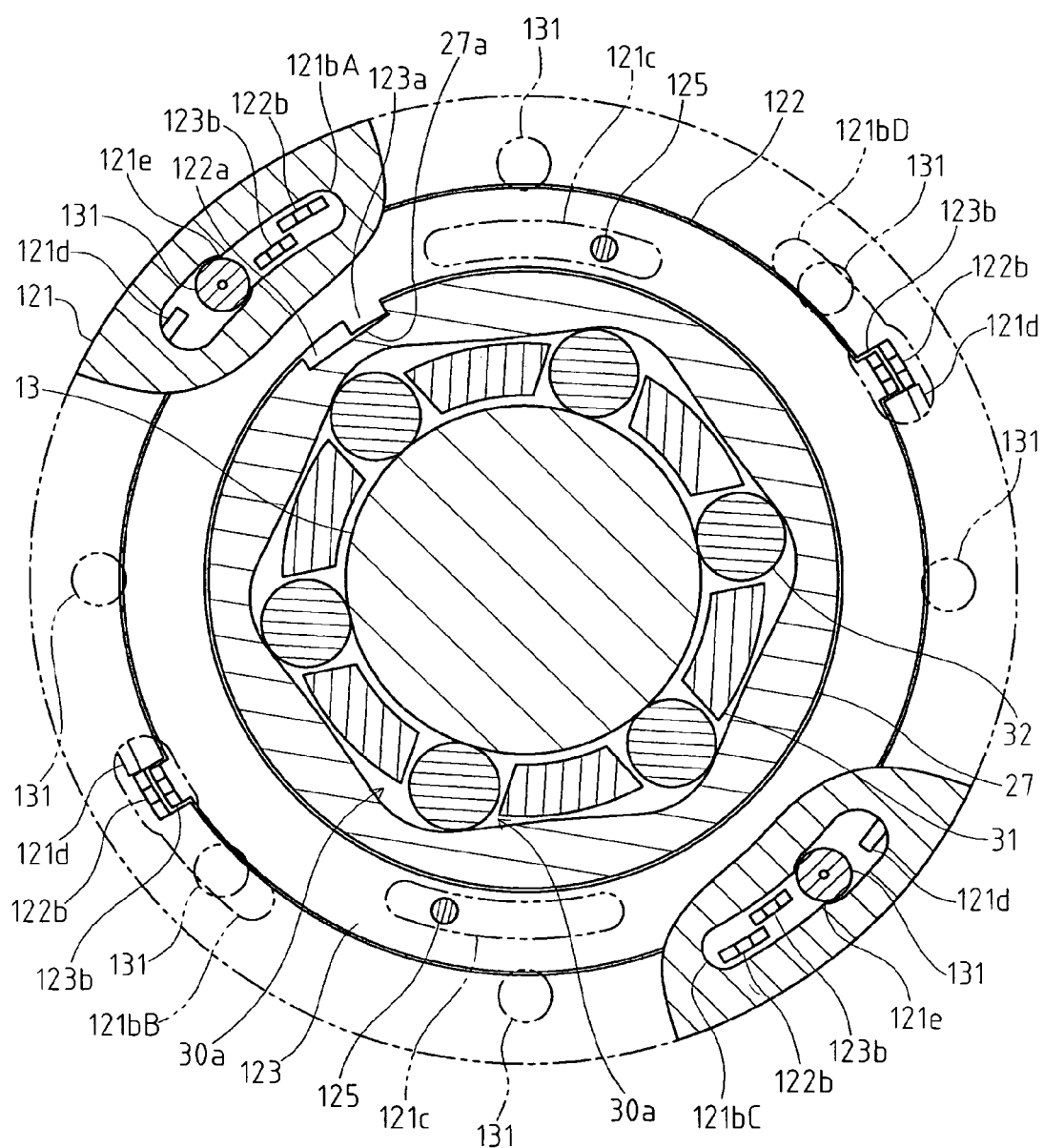
FIG. 18 is a fragmentary sectional view of the tow-way clutch of the sixth embodiment when viewed in the axial direction of the output side rotors (the differential output shafts), showing a locative relation among the first, second and third rotors in a state where the forcible engaging member engages with the first rotor so as to restrict the rotation of the cage after the rotational direction of the input side rotor is reversed.

As shown in FIGS. 16 and 20(*a*), second and third rotors 122 and 123 are normally disposed relative to first rotor 121 so that, in each groove 121*b*, one of pawls 122*b* and 123*b* is disposed in the wide portion and the other pawl 123*b* or 122*b* is disposed in the narrow portion. As mentioned above, on the start of reversed rotation of ring gear shaft 27, third rotor 123 rotates relative to second rotor 122 before key 123*a* abuts against one end of key groove 27*a*, thereby changing the locative relation of pawls 122*b* and 123*b* in each groove 121*b*. More specifically, both pawls 122*b* and 123*b* temporarily come into the narrow portion of each groove 121*b*, as shown in FIGS. 17, 18, 20(*b*) and 20(*c*). In this state, in either the pair of opposite grooves 121*b*A and 121*b*C or the pair of opposite grooves 121*b*B and 121*b*D, pawls 122*b* and 123*b* entirely overlap each other in the radial direction of first rotor 121 (in grooves 121*b*B and 121*b*D in FIGS. 17 and 18), and in the other pair, pawls 122*b* and 123*b* are substantially offset from each other in the radial direction of first rotor 121.

Forcible engaging pins 131 are extended in parallel to differential output shaft 13 and not-relatively rotatably held in fourth casing part 112D. Forcible engaging pins 131 are disposed around differential output shaft 13 at regular intervals on the alignment line of grooves 121*b* in the peripheral direction of first rotor 121. Forcible engaging pins 131 are axially slidably fitted through respective springs 132 into respective casings 133 fixed through fourth casing part 112D. Springs 132 press respective forcible engaging pins 131 against first rotor 121, so as to frictionally press the axial inside surface of the outer peripheral edge portion of first rotor 121 against the wall surface of second casing part 112B serving as the unrotatable portion of bi-directional clutch 111, thereby ensuring the frictional rotation of cage 31 with first rotor 121 relative to front-wheel differential gear casing 112 (second casing part 112B) through forcible engaging pins 131.

When the rotational direction of ring gear shaft 27 is reversed, two corresponding forcible engaging pins 131 are inserted into the wide portions of either the pair of opposite grooves 121*b*A and 121C or the pair of opposite grooves 121*b*B and 121*b*D. FIGS. 16, 17, 18 and 19 are referred to a representative process of engaging forcible engaging pins 131 into grooves 121*b*A and 121*b*C. In the representative process, due to the reversed rotation of ring gear shaft 27, in grooves 121*b*A and 121*b*C, the wide portions including the first end and stepped edge 121*e* is disposed before the narrow portions including the second end in the rotational direction of first rotor 121, and in grooves 121*b*B and 121*b*D, the wide portions including the first end and stepped edge 121*e* is disposed after the narrow portions including the second end in the rotational direction of first rotor 121.

FIG. 16 shows a state of bi-directional clutch 111 when the vehicle is stationary. In the state, in each of grooves 121*b*A and 121*b*C, pawl 123*b* is disposed in the wide portion so as to prevent forcible engaging pin 131 from being inserted thereinto, and pawl 122*b* is disposed in the narrow portion, as shown in FIG. 20(*a*). Further, in each of grooves 121*b*B and 121*b*D, pawl 122*b* is disposed in the wide portion so as to prevent forcible engaging pin 131 from being inserted thereinto, and pawl 123*b* is disposed in the narrow portion. As shown in FIG. 16, key 123*a* of third rotor 123 abuts against one end of key groove 27*a* in the peripheral direction.

Referring to a start period of the reversed rotation of ring gear shaft 27 from the state of FIG. 16 to a state of FIG. 17, second rotor 122 rotates integrally with ring gear shaft 27 while third rotor 123 still remains as far as key 123*a* having abutting against the one end of key groove 27*a* is allowed to relatively slide in key groove 27*a* to the other end of key groove 27*a*. During the start period, first rotor 121 and cage 31 essentially delays after the rotation of ring gear shaft 27 and second rotor 122. However, in the case that ring gear shaft 27 is wedged with differential output shafts 13 through rollers 32 held by cage 31, first rotor 121 and cage 31 rotate substantially integrally with second rotor 122 and ring gear shaft 27. Consequently, as shown in FIG. 17, in each of grooves 121*b*A and 121*b*C, pawl 123*b* having been disposed in the wide portion in the state of FIG. 16 comes into the narrow portion, so that the wide portion of each of grooves 121*b*A and 121*b*C comes to permit passing of forcible engaging pin 131 therethrough. Incidentally, during the period, in each of grooves 121*b*B and 121*b*D, pawl 122*b* having been disposed in the narrow portion in the state of FIG. 16 comes into the wide portion, so as to prevent forcible engaging pin 131 from being inserted into each of grooves 121*b*B and 121*b*D.

After key 123*a* abuts against the other end of key groove 27*a* as shown in FIG. 17, third rotor 123 rotates together with second rotor 122 according to the rotation of ring gear shaft 27. First rotor 121 rotates integrally with cage 31 following the rotation of ring gear shaft 27 and second and third rotors 122 and 123. Then, as shown in FIGS. 18 and 20(*b*), forcible engaging pins 131 are inserted into the wide portions of respective grooves 121*b*A and 121*b*C. In this regard, needles 121*d* in grooves 121*b*A and 121*b*C guide forcible engaging pins 131 into the wide portions of grooves 121*b*A and 121*b*C. Due to delay of rotation of first rotor 121 fitted on cage 31 after rotation of ring gear shaft 27 together with second and third rotors 122 and 123, forcible engaging pins 131 in the wide portions of grooves 121*b*A and 121*b*C move toward the narrow portions of grooves 121*b*A and 121*b*C, and finally abut against stepped edges 121*e*, as shown in FIG. 18. Therefore, while second and third rotors 122 and 123 rotate together with ring gear shaft 27, the rotation of cage 31 and first rotor 121 is stopped by unrotatable fourth casing part 112D through forcible engaging pins 131, thereby canceling wedging of rollers 32 held in cage 31 between ring gear shaft 27 and differential output shafts 13.

Figure 19:
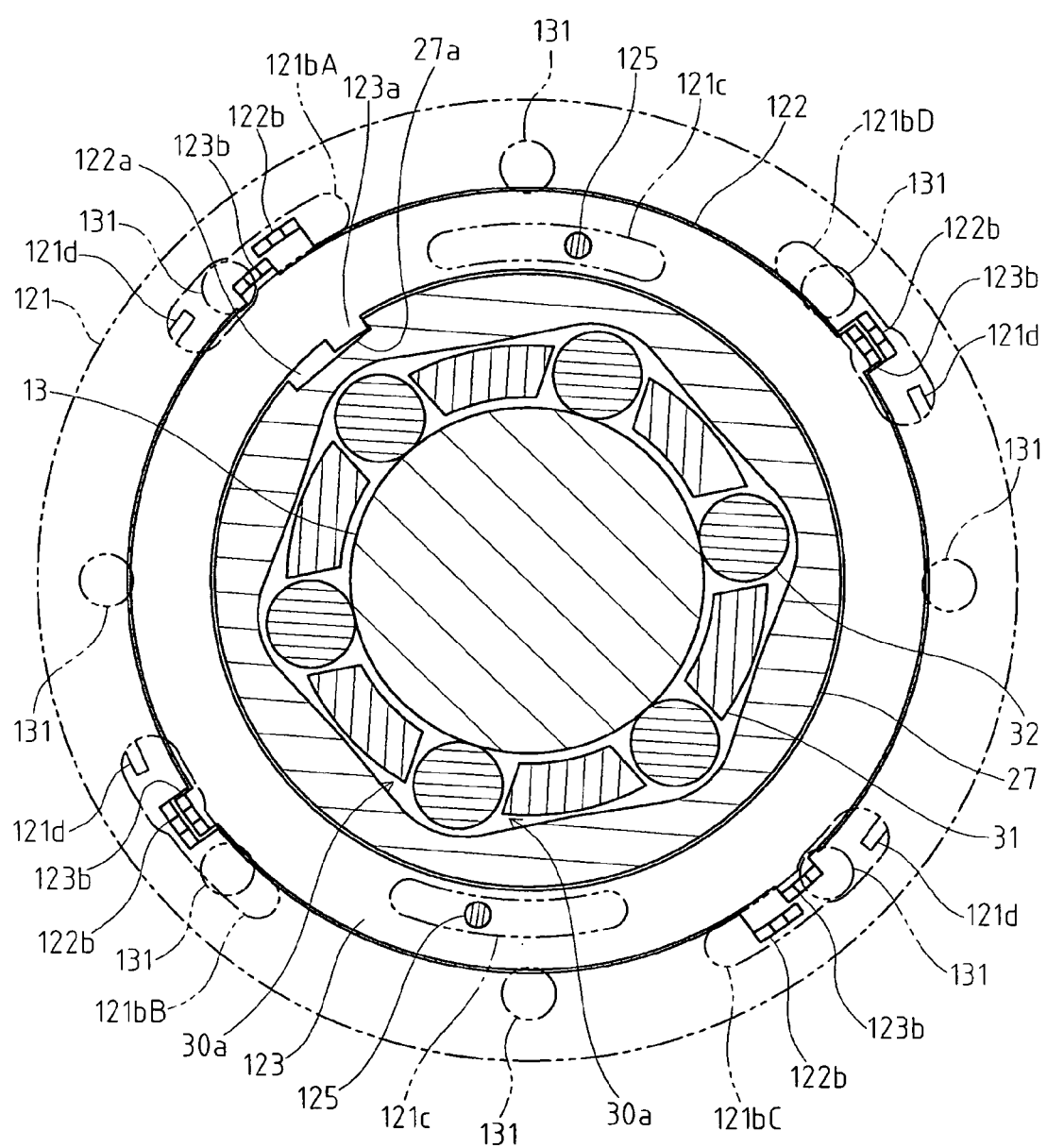
FIG. 19 is a fragmentary sectional view of the tow-way clutch of the sixth embodiment when viewed in the axial direction of the output side rotors (the differential output shafts), showing a locative relation among the first, second and third rotors in a state subsequent to the state of FIG. 18, where the forcible engaging member having engaged with the first rotor is separated so as to cancel the restriction of rotation of the cage.

Due to the rotation of second and third rotors 122 and 123 together with ring gear shaft 27 relative to first rotor 121 stopped by forcible engaging pins 131, in each of grooves 121*b*A and 121*b*C, pawls 122*b* and 123*b* having been disposed in the narrow portion move toward the wide portion, and either of pawls 122*b* and 123*b* (in FIGS. 19 and 20(*c*), pawl 123*b*) comes to abut against forcible engaging pin 131 inserted in the wide portion, as shown in FIGS. 19 and 20(*c*), pushes forcible engaging pin 131 along the slanted edge thereof and removes it from the wide portion of each of grooves, thereby disengaging first rotor 121 from forcible engaging pins 131 and allowing cage 31 and first rotor 121 to rotate following ring gear shaft 27. Incidentally, pawls 122*b* and 123*b* in each of grooves 121*b*B and 121*b*D are still disposed at a position such as to prevent forcible engaging pin 131 from entering corresponding groove 121*b*. Afterward, all forcible engaging pins 131 are frictionally pressed against the axial outside surface of first rotor 121 and prevented from entering all grooves 121*b* so as to allow cage 31 and first rotor 121 to rotate following ring gear shaft 27, and bi-directional clutch 111 can be clutched off for putting the vehicle into the two-wheel drive mode.

In this way, in order to temporarily restrict rotation of cage 31 for canceling wedging of ring gear shaft 27 with differential output shafts 13, bi-directional clutch 111 comprises: first rotor 121 which is rotatable integrally with cage 31; forcible engaging pins 131 engaged or disengaged to and from first rotor 121; springs 132 for thrusting respective forcible engaging pins 131 in the direction for engagement with first rotor 121. Second and third rotors 122 and 123 are provided with pawls 122*b* and 123*b* for disengaging forcible engaging pins 131 from first rotor 121.

Figure 21:
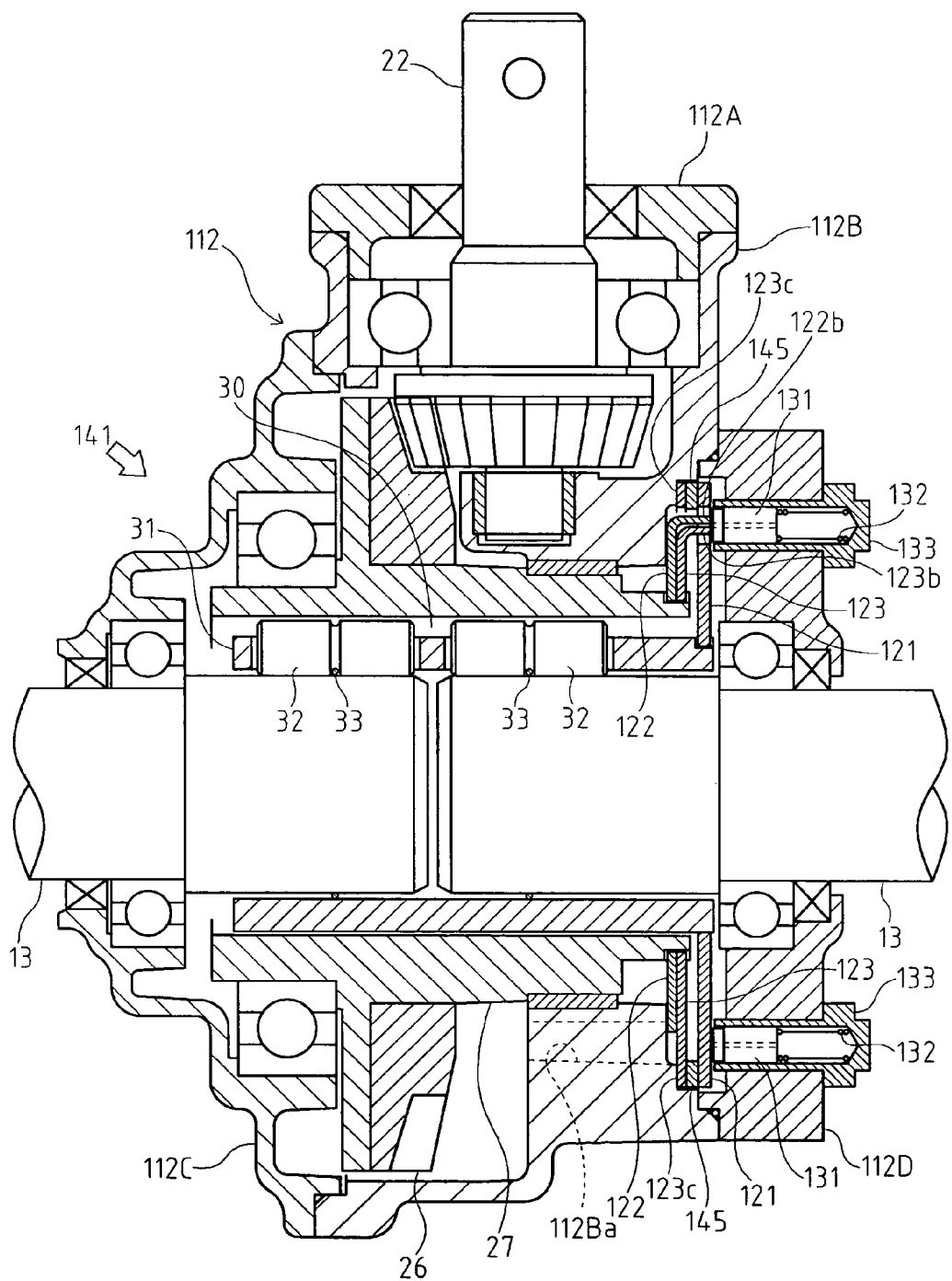
FIG. 21 is a sectional plan view of a differential gear unit with a bi-directional clutch according to a seventh embodiment of the invention.

Description will now be given of a differential gear unit (serving as front-wheel differential gear unit 11 when it is used for the vehicle of FIG. 22) including a bi-directional clutch 141 according to a seventh embodiment of the invention, with reference to FIG. 21.

Bi-directional clutch 141 disposed in front-wheel differential gear casing 112 is substantially similar to bi-directional clutch 111 of the sixth embodiment, excluding structure of frictional engaging means for frictionally and relatively rotatably engaging cage 31 with an unrotatable portion in bi-directional clutch 141. In bi-directional clutch 141, third rotor 123 includes radially outwardly extended peripheral edge 123*c*. Edge 123*c* of third rotor 123 is disposed radially outward from pawls 123*b* projecting from third rotor 123 toward first rotor 121, and extended radially outward from the outer peripheral edge of second rotor 122. In this regard, third rotor 123 is formed with grooves through which respective pawls 123*b* and pawls 122*b* extended from second rotor 122 are passed. Edge 123*c* of third rotor 123 abuts against a wall surface of second casing part 112B around the outer peripheral edge of second rotor 122, and substantially entirely overlaps first rotor 121 when axially viewed. A friction ring 145 is disposed between edge 123*c* of third rotor 123 and the outer peripheral edge of first rotor 121. Due to the pressure of forcible engaging pins 131 biased by springs 132 against first rotor 121, edge 123*c* of third rotor 123 is pressed between the wall surface of second casing part 112B and friction ring 145, so as to be frictionally rotatable relative to unrotatable second casing part 112B.

An oil passage 112Ba is bored within a wall of second casing part 112B so as to fluidly connect a chamber between second casing part 112B and fourth casing part 112D, in which rotors 121, 122 and 123 are disposed, to a chamber between second casing part 112B and third casing part 112C, in which ring gear 26 is disposed. Therefore, friction ring 145 in the chamber between second and fourth casing parts 112B and 112D can be lubricated by oil from the chamber between second and third casing parts 112B and 112C.

Figure 23:
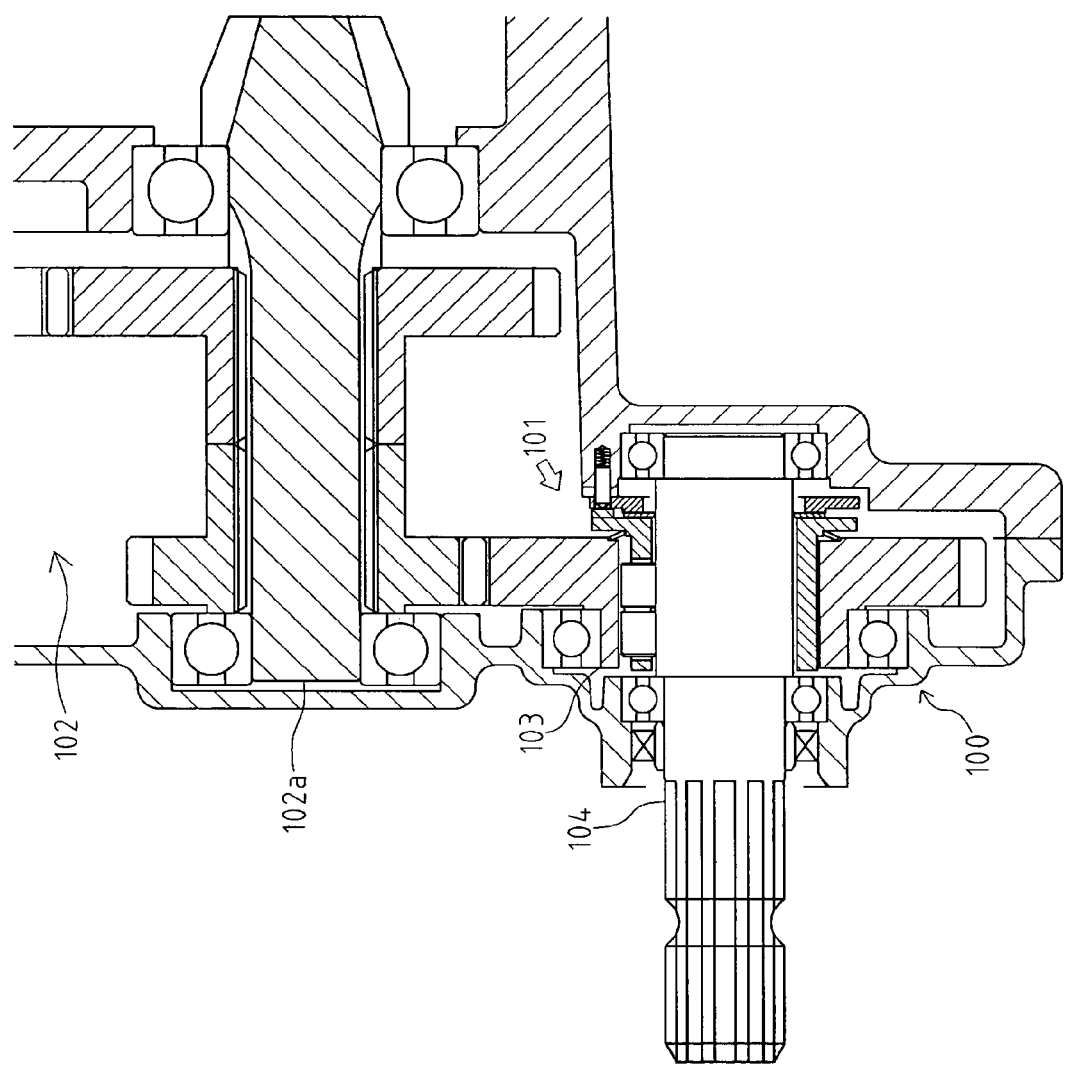
FIG. 23 is a sectional view of a PTO device for driving front wheels, which is provided in a transmission for driving a rear wheel, using the bi-directional clutch (especially, similar to the bi-directional clutch of the first embodiment) having the system for forcible rotation-restriction during a rotational reversing of a shaft.

In each of the foregoing embodiments, the bi-directional clutch is provided in a front-wheel differential gear casing applied to the vehicle as shown in FIG. 22. Alternatively, referring to FIG. 23, a vehicle is equipped with a transmission 102 incorporating an output shaft 102a, a PTO shaft 104 disposed downstream of output shaft 102a, and an automatic bi-directional clutch 101 interposed between output shaft 102a and PTO shaft 104. Illustrated bi-directional clutch 101 is configured as bi-directional clutch 11 of the first embodiment, however, bi-directional clutch 101 may be configured as any of the foregoing bi-directional clutches among the first to seventh embodiments. Preferably, output shaft 102a is drivingly connected to a differential unit between rear wheel axles, and PTO shaft 104 is drivingly connected to front-wheel axles through a propeller shaft and universal joints. In bi-directional clutch 101, a ring gear shaft serves as an input side rotor drivingly connected to output shaft 102a through meshing gears, and PTO shaft 104 serves as an only single output side rotor to be driven by the input side rotor, in comparison with the pair of differential output shafts 13 which serve as a pair of output side rotors sharing rotational power of ring gear shaft 27 serving as the input side rotor in each of the foregoing bi-directional clutches for the front-wheel differential gear unit.

It is further understood by those skilled in the art that the foregoing description is a preferred embodiment of the disclosed apparatus and that various changes and modifications may be made in the invention without departing from the spirit and scope thereof defined by the following claims.

What is claimed is:

1. A bi-directional clutch comprising:
an input portion;
an input side rotor drivingly connected to the input portion;
an output side rotor coaxially disposed inside the input side rotor, so as to make an annular space between an inner peripheral surface of the input side rotor and an outer peripheral surface of the output side rotor;
a cage disposed in the annular space;
a plurality of rollers held by the cage so as to be able to engage with both the inner peripheral surface of the input side rotor and the outer peripheral surface of the output side rotor, and to disengage from at least either the inner peripheral surface of the input side rotor or the outer peripheral surface of the output side rotor;
an unrotatable portion;
frictional engaging means frictionally engaging the cage with the unrotatable portion so as to allow the cage to be rotatable relative to the unrotatabe portion;
a casing incorporating the input side rotor, the output side rotor, the cage, the rollers and the frictional engaging means; and
rotation restricting means for restricting rotation of the cage holding the rollers,
wherein, when a rotary speed of the output side rotor is larger than a rotary speed of the input side rotor, the output side rotor is isolated from the rotary force of the input side rotor,
wherein, when a rotary speed of the output side rotor is smaller than a rotary speed of the input side rotor, the rollers engage with the inner peripheral surface of the input side rotor and the outer peripheral surface of the output side rotor so as to wedge the input side rotor with the output side rotor, thereby allowing the rotary force of the input side rotor to be transmitted to the output side rotor, and
wherein the rotation restricting means temporarily restricts the rotation of the cage when a rotary direction of the input side rotor wedged with the output side rotor through the rollers is reversed,
the rotation restricting means including:
a receiving portion formed on an end surface of the cage;
a forcible engaging member held by the casing so as to be prevented from rotating relative to the casing;
a spring biasing the forcible engaging member so as to thrust the forcible engaging member toward the receiving portion; and
a retainer for holding the forcible engaging member separated from the receiving portion, wherein, only when the rotary direction of the input side rotor is reversed, the retainer allows the forcible engaging member biased by the spring to thrust toward the receiving portion and finally engage with the receiving portion so as to restrict the rotation of the cage.

2. The bi-directional clutch according to claim 1, the frictional engaging means including:
a spring interposed between the cage and the input side rotor so as to frictionally press the cage against the retainer, allowing the cage to be rotatable relative to the retainer.

3. The bi-directional clutch according to claim 2, wherein, when rotation of the input side rotor is reversed, the retainer rotates following the cage so as to thrust and engage the forcible engaging member to the retaining portion.

4. The bi-directional clutch according to claim 3, further comprising:
second rotation restriction means for restricting rotation of the retainer following the cage; and
releasing means for canceling restriction of the rotation of the cage after the second rotation restriction means restricts the rotation of the retainer.

5. The bi-directional clutch according to claim 4, the second rotation restriction means including:
a pair of projections disposed at a certain interval therebetween on the retainer; and
a retaining portion integrally provided on the casing between the pair of projections, wherein, the rotation of the retainer following the cage is restricted by fitting one of the projections onto the retaining portion.

6. The bi-directional clutch according to claim 4, the releasing means including the receiving portion and the retainer, wherein the receiving portion projects from the end surface of the cage so that, during the rotation of the retainer following the cage, the receiving portion fitting the forcible engaging member pushes the forcible engaging member toward the retainer and finally separates the forcible engaging member therefrom, and then the retainer holds the forcible engaging member separated from the retaining portion.

7. The bi-directional clutch according to claim 1, wherein the output side rotors are provided in a pair and share the common input side rotor, and wherein the plurality of rollers held by the cage are provided to the pair of output side rotors, respectively.

8. A vehicle comprising:
a prime mover;
a pair of drive wheels; and
the bi-directional clutch according to claim 1, interposed between the prime mover and the pair of drive wheels.

9. A bi-directional clutch comprising:
an input portion;

an input side rotor drivingly connected to the input portion;
an output side rotor coaxially disposed inside the input side rotor, so as to make an annular space between an inner peripheral surface of the input side rotor and an outer peripheral surface of the output side rotor;
a cage disposed in the annular space;
a plurality of rollers held by the cage so as to be able to engage with both the inner peripheral surface of the input side rotor and the outer peripheral surface of the output side rotor, and to disengage from at least either the inner peripheral surface of the input side rotor or the outer peripheral surface of the output side rotor;
an unrotatable portion;
frictional engaging means frictionally engaging the cage with the unrotatable portion so as to allow the cage to be rotatable relative to the unrotatbe portion;
a casing incorporating the input side rotor, the output side rotor, the cage, the rollers and the frictional engaging means; and
rotation restricting means for restricting rotation of the cage holding the rollers,
wherein, when a rotary speed of the output side rotor is larger than a rotary speed of the input side rotor, the output side rotor is isolated from the rotary force of the input side rotor
wherein, when a rotary speed of the output side rotor is smaller than a rotary speed of the input side rotor, the rollers engage with the inner peripheral surface of the input side rotor and the outer peripheral surface of the output side rotor so as to wedge the input side rotor with the output side rotor, thereby allowing the rotary force of the input side rotor to be transmitted to the output side rotor, and
wherein the rotation restricting means temporarily restricts the rotation of the cage when a rotary direction of the input side rotor wedged with the output side rotor through the rollers is reversed,
the rotation restricting means including:
a receiving portion formed on an end surface of the cage;
a forcible engaging member held by the casing so as to be prevented from rotating relative to the casing;
a biasing member biasing the forcible engaging member opposite to the end surface of the cage; and
a cam member frictionally pressed against the input side rotor so as to be rotatable relative to the input side rotor, the cam member including a cam portion, wherein when the forcible engaging member is held to be separated from the receiving portion by the biasing force of the biasing member, the cam member can rotate following the input side rotor only by reversing rotation of the input side rotor, and due to the rotation of the cam member following the input side rotor, the forcible engaging member rides on the cam portion of the cam member, thrusts toward the receiving portion against the biasing force of the biasing member, and finally engages with the receiving portion.

10. The bi-directional clutch according to claim 9, further comprising:
second rotation restriction means for restricting rotation of the cam member following the input side rotor; and
releasing means for canceling restriction of the rotation of the cage after the second rotation restriction means restricts the rotation of the cam member.

11. The bi-directional clutch according to claim 10, the second rotation restriction means including:
a retainer disposed between the cam member and the input side rotor with the cage so as to be prevented from rotating relative to the casing;
an opening formed through the retainer and extended in the rotational direction of the cam member; and
a restriction member projecting from the cam member and passed through the opening so as to be rotatable relative to the retainer, wherein the restriction member is frictionally pressed against the input side rotor so as to allow the cam member to rotate relative to the input side rotor, and wherein the restriction member can abut against either of opposite ends of the opening in the rotational direction of the cam member so as to restrict the rotation of the cam member following the input side rotor.

12. The bi-directional clutch according to claim 11, wherein the forcible engaging member penetrates the retainer between the receiving portion and the cam member.

13. The bi-directional clutch according to claim 11, the releasing means including:
the biasing member which separates the forcible engaging member from the receiving portion when the forcible engaging member is removed from the cam portion of the cam member.

14. The bi-directional clutch according to claim 11, the frictional engaging means including:
a spring interposed between the cage and the input side rotor so as to frictionally press the cage against the retainer, allowing the cage to be rotatable relative to the retainer.

15. The bi-directional clutch according to claim 14, the frictional engaging means further including:
a friction plate for frictionally fitting the cage to the retainer.

16. The bi-directional clutch according to claim 14, the frictional engaging means further including:
an electromagnet for frictionally fitting the cage to the retainer.

17. The bi-directional clutch according to claim 9, wherein the output side rotors are provided in a pair and share the common input side rotor, and wherein the plurality of rollers held by the cage are provided to the pair of output side rotors, respectively.

18. A vehicle comprising:
a prime mover;
a pair of drive wheels; and
the bi-directional clutch according to claim 9, interposed between the prime mover and the pair of drive wheels.

19. A bi-directional clutch comprising:
an input portion;
an input side rotor drivingly connected to the input portion;
an output side rotor coaxially disposed inside the input side rotor, so as to make an annular space between an inner peripheral surface of the input side rotor and an outer peripheral surface of the output side rotor;
a cage disposed in the annular space;
a plurality of rollers held by the cage so as to be able to engage with both the inner peripheral surface of the input side rotor and the outer peripheral surface of the output side rotor, and to disengage from at least either the inner peripheral surface of the input side rotor or the outer peripheral surface of the output side rotor;
an unrotatable portion;
frictional engaging means frictionally engaging the cage with the unrotatable portion so as to allow the cage to be rotatable relative to the unrotatabe portion;

a casing incorporating the input side rotor, the output side rotor, the cage, the rollers and the frictional engaging means; and rotation restricting means for restricting rotation of the cage holding the rollers, wherein, when a rotary speed of the output side rotor is larger than a rotary speed of the input side rotor, the output side rotor is isolated from the rotary force of the input side rotor, wherein, when a rotary speed of the output side rotor is smaller than a rotary speed of the input side rotor, the rollers engage with the inner peripheral surface of the input side rotor and the outer peripheral surface of the output side rotor so as to wedge the input side rotor with the output side rotor, thereby allowing the rotary force of the input side rotor to be transmitted to the output side rotor, and wherein the rotation restricting means temporarily restricts the rotation of the cage when a rotary direction of the input side rotor wedged with the output side rotor through the rollers is reversed, the rotation restricting means including:

a receiving portion formed on an end surface of the cage;

a forcible engaging member held by the casing so as to be prevented from rotating relative to the casing, wherein the forcible engaging member can engage with the receiving portion so as to restrict rotation of the cage;

a spring biasing the forcible engaging member so as to thrust the forcible engaging member toward the receiving portion;

a retainer for holding the forcible engaging member separated from the receiving portion; and an electromagnet which releases the forcible engaging member from the retainer and allows the forcible engaging member to thrust and engage to the receiving portion only when rotation of the input side rotor is reversed.

20. The bi-directional clutch according to claim 19, wherein the output side rotors are provided in a pair and share the common input side rotor, and wherein the plurality of rollers held by the cage are provided to the pair of output side rotors, respectively.

21. A vehicle comprising:
a prime mover;
a pair of drive wheels; and
the bi-directional clutch according to claim 19, interposed between the prime mover and the pair of drive wheels.

22. A bi-directional clutch comprising:
an input portion;
an input side rotor drivingly connected to the input portion;
an output side rotor coaxially disposed inside the input side rotor, so as to make an annular space between an inner peripheral surface of the input side rotor and an outer peripheral surface of the output side rotor;
a cage disposed in the annular space;
a plurality of rollers held by the cage so as to be able to engage with both the inner peripheral surface of the input side rotor and the outer peripheral surface of the output side rotor, and to disengage from at least either the inner peripheral surface of the input side rotor or the outer peripheral surface of the output side rotor;
an unrotatable portion;
frictional engaging means frictionally engaging the cage with the unrotatable portion so as to allow the cage to be rotatable relative to the unrotatabe portion;
a casing incorporating the input side rotor, the output side rotor, the cage, the rollers and the frictional engaging means; and rotation restricting means for restricting rotation of the cage holding the rollers, wherein, when a rotary speed of the output side rotor is larger than a rotary speed of the input side rotor, the output side rotor is isolated from the rotary force of the input side rotor, wherein, when a rotary speed of the output side rotor is smaller than a rotary speed of the input side rotor, the rollers engage with the inner peripheral surface of the input side rotor and the outer peripheral surface of the output side rotor so as to wedge the input side rotor with the output side rotor, thereby allowing the rotary force of the input side rotor to be transmitted to the output side rotor, and wherein the rotation restricting means temporarily restricts the rotation of the cage when a rotary direction of the input side rotor wedged with the output side rotor through the rollers is reversed, the rotation restricting means including:

a first rotor prevented from rotating relative to the cage, the first rotor including an opening extended in the rotational direction thereof;

a forcible engaging member held by the casing so as to be prevented from rotating relative to the casing; and a spring biasing the forcible engaging member so as to thrust the forcible engaging member toward the first rotor, wherein the forcible engaging member is thrust to be inserted into the opening and engages with the first rotor so as to restrict rotation of the cage only when the rotational direction of the input side rotor is reversed.

23. The bi-directional clutch according to claim 22, the frictional engaging means including:

a plurality of the forcible engaging members frictionally pressed against the first rotor so as to press an outer peripheral edge of the first rotor against a part of the casing.

24. The bi-directional clutch according to claim 23, further comprising:

a second rotor disposed opposite to the first rotor with respect to the forcible engaging members so as to be prevented from rotating relative to the input side rotor;

a projection projecting from the second rotor into the opening of the first rotor, and being rotatable integrally with the second rotor;

a third rotor juxtaposed with the second rotor opposite to the first rotor with respect to the forcible engaging members so as to be prevented from rotating relative to the second rotor and the input side rotor but to be allowed to rotate relative to the second rotor and the input side rotor within an only limited range; and another projection projecting from the third rotor into the opening of the first rotor and being rotatable integrally with the third rotor, wherein at least one of the projections projecting from the respective second and third rotors is disposed so as to prevent the forcible engaging member from entering the opening of the first rotor unless the rotational direction of the input side rotor is reversed.

25. The bi-directional clutch according to claim 24, wherein, when the rotational direction of the input side rotor is reversed, the third rotor rotates relative to the second rotor within the limited range so as to move the projection projecting from the third rotor in the opening of the first rotor, thereby ensuring a space in the opening of the first rotor into which the forcible engaging member is inserted and engaged with the first rotor so as to temporarily restrict the rotation of the first rotor and the cage.

26. The bi-directional clutch according to claim 25, wherein, during rotation of the second and third rotors after the engagement of the forcible engaging member with the first rotor, the forcible engaging member is guided by either of the projections projecting from the second and third rotors so as to be removed from the opening of the first rotor, and pressed against the first rotor outside of the opening while disengaging from the first rotor.

27. The bi-directional clutch according to claim 22, wherein the output side rotors are provided in a pair and share the common input side rotor, and wherein the plurality of rollers held by the cage are provided to the pair of output side rotors, respectively.

28. A vehicle comprising:
   a prime mover;
   a pair of drive wheels; and
   the bi-directional clutch according to claim 22, interposed between the prime mover and the pair of drive wheels.

* * * * *